(12) United States Patent
Kubota et al.

(10) Patent No.: US 11,427,163 B2
(45) Date of Patent: Aug. 30, 2022

(54) VEHICLE CLEANER SYSTEM AND VEHICLE INCLUDING VEHICLE CLEANER SYSTEM

(71) Applicant: KOITO MANUFACTURING CO., LTD., Tokyo (JP)

(72) Inventors: Akinobu Kubota, Shizuoka (JP); Masayuki Kondo, Shizuoka (JP); Kazuki Kawamura, Shizuoka (JP); Masaru Sakai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 15 days.

(21) Appl. No.: 16/622,774

(22) PCT Filed: Jun. 12, 2018

(86) PCT No.: PCT/JP2018/022415
§ 371 (c)(1),
(2) Date: Dec. 13, 2019

(87) PCT Pub. No.: WO2018/230558
PCT Pub. Date: Dec. 20, 2018

(65) Prior Publication Data
US 2020/0139939 A1    May 7, 2020

(30) Foreign Application Priority Data

Jun. 13, 2017  (JP) .............................. JP2017-115871
Jun. 13, 2017  (JP) .............................. JP2017-115874
(Continued)

(51) Int. Cl.
*B60S 1/48*    (2006.01)
*B60S 1/52*    (2006.01)
(Continued)

(52) U.S. Cl.
CPC ................. *B60S 1/481* (2013.01); *B08B 3/04* (2013.01); *B60S 1/52* (2013.01); *B60S 1/56* (2013.01);
(Continued)

(58) Field of Classification Search
None
See application file for complete search history.

(56) References Cited

U.S. PATENT DOCUMENTS 5,170,107 A       12/1992  Araki
2003/0075207 A1*  4/2003  Fukushima .............. B60S 1/50
                                                         134/123
(Continued)

FOREIGN PATENT DOCUMENTS

DE    3825178 A1 *  2/1990
DE    3825178 A1    2/1990
(Continued)

OTHER PUBLICATIONS

Extended European Search Report issued in European Application No. 18817676.2, dated Apr. 28, 2021 (13 pages).
(Continued)

*Primary Examiner* — Michael E Barr
*Assistant Examiner* — Omair Chaudhri
(74) *Attorney, Agent, or Firm* — Osha Bergman Watanabe & Burton LLP

(57) ABSTRACT

A vehicle cleaner system includes: a window washer configured to clean a front window of a vehicle; a lamp cleaner configured to clean a headlamp; a sensor cleaner configured to clean a sensor that detects information outside the vehicle; and a cleaner control unit configured to operate at least one of the window washer, the lamp cleaner, and the sensor cleaner in accordance with input of a signal. The cleaner control unit is configured to operate the window washer, the
(Continued)

| OBJECT TO BE CLEANED | | FRONT/REAR WINDOW | EXTERNAL SENSOR | HEADLAMP | SUITABLE TIME PERIOD | SUITABLE DRIVING MODE |
|---|---|---|---|---|---|---|
| CLEANER TYPE | | WW | LC, CAMERA CLEANER | HC | | |
| MODE | MODE A | 4/4 | 2/4 | 1/4 | DAY-TIME | DRIVING ASSISTANCE |
| | MODE B | 4/4 | 1/4 | 2/4 | DAY-TIME | MANUAL DRIVING |
| | MODE C | 2/4 | 4/4 | 1/4 | DAY-TIME | FULLY AUTOMATIC DRIVING, ADVANCED DRIVING ASSISTANCE, DRIVING ASSISTANCE |
| | MODE D | 2/4 | 1/4 | 4/4 | NIGHT-TIME | MANUAL DRIVING |
| | MODE E | 1/4 | 4/4 | 2/4 | NIGHT-TIME | FULLY AUTOMATIC DRIVING, ADVANCED DRIVING ASSISTANCE |
| | MODE F | 1/4 | 2/4 | 4/4 | NIGHT-TIME | FULLY AUTOMATIC DRIVING, ADVANCED DRIVING ASSISTANCE |
| | MODE G | 4/4 | 4/4 | 2/4 | DAY-TIME | FULLY AUTOMATIC DRIVING, ADVANCED DRIVING ASSISTANCE, DRIVING ASSISTANCE, MANUAL DRIVING |
| | MODE H | 4/4 | 2/4 | 4/4 | NIGHT-TIME | MANUAL DRIVING |
| | MODE I | 2/4 | 4/4 | 4/4 | NIGHT-TIME | FULLY AUTOMATIC DRIVING, ADVANCED DRIVING ASSISTANCE |

4/4: 4 OPERATIONS PER 4 CLEANER OPERATION SIGNALS
2/4: 2 OPERATIONS PER 4 CLEANER OPERATION SIGNALS
1/4: 1 OPERATION PER 4 CLEANER OPERATION SIGNALS lamp cleaner, and the sensor cleaner such that at least two or more of a number of operations of the window washer, a number of operations of the lamp cleaner, and a number of operations of the sensor cleaner are different in accordance with a predetermined number of signals.

5 Claims, 26 Drawing Sheets

(30) Foreign Application Priority Data

Jun. 13, 2017 (JP) .............................. JP2017-115876
Jun. 13, 2017 (JP) .............................. JP2017-115878

(51) Int. Cl.
  *B60S 1/56* (2006.01)
  *B08B 3/04* (2006.01)
  *G01S 7/497* (2006.01)

(52) U.S. Cl.
  CPC ....... *G01S 7/497* (2013.01); *G01S 2007/4977* (2013.01)

(56) References Cited

U.S. PATENT DOCUMENTS

| | | | | |
|---|---|---|---|---|
| 2003/0222156 A1* | 12/2003 | Bissonnette | ............ | B60S 1/488 239/284.1 |
| 2006/0157639 A1* | 7/2006 | Shaffer | .................... | G06T 5/50 250/208.1 |
| 2011/0073142 A1 | 3/2011 | Hattori et al. | | |
| 2012/0117745 A1 | 5/2012 | Hattori et al. | | |
| 2012/0266403 A1* | 10/2012 | Fitterer | .................. | B60S 1/524 15/250.04 |
| 2012/0266926 A1* | 10/2012 | Kikuta | ................. | B60S 1/0848 134/58 R |
| 2013/0037627 A1* | 2/2013 | Kikuta | .................... | B60S 1/583 239/284.1 |
| 2013/0048035 A1 | 2/2013 | Doi et al. | | |
| 2013/0255023 A1* | 10/2013 | Kikuta | .................... | B60S 1/483 15/250.02 |
| 2013/0292488 A1 | 11/2013 | Jeuffe et al. | | |
| 2014/0367488 A1* | 12/2014 | Dominique | ............... | B60S 1/50 239/284.2 |
| 2015/0183404 A1 | 7/2015 | Romack et al. | | |
| 2015/0296108 A1* | 10/2015 | Hayakawa | ................ | B60R 1/00 348/148 |
| 2016/0016536 A1* | 1/2016 | Merwald | ............... | B60S 1/0866 701/36 |
| 2017/0036650 A1* | 2/2017 | Hester | ....................... | B60S 1/52 |
| 2017/0072914 A1 | 3/2017 | Caillot | | |
| 2017/0259789 A1 | 9/2017 | McAndrew | | |
| 2019/0099768 A1* | 4/2019 | Romack | ................ | B05B 1/3006 |
| 2020/0122691 A1* | 4/2020 | Werner | .................... | B60S 1/50 |
| 2020/0391702 A1* | 12/2020 | Yamauchi | ................ | B60S 1/56 |

FOREIGN PATENT DOCUMENTS

| | | | | |
|---|---|---|---|---|
| DE | 102011121312 A1 | * | 6/2013 | ............ B60S 1/0862 |
| DE | 102011121312 A1 | | 6/2013 | |
| DE | 102016006039 A1 | | 11/2016 | |
| EP | 1125807 B1 | | 2/2017 | |
| GB | 1376635 A | | 12/1974 | |
| JP | H03-248948 A | | 11/1991 | |
| JP | H04-057469 U | | 5/1992 | |
| JP | 2006-182040 A | | 7/2006 | |
| JP | 2006182040 A | * | 7/2006 | |
| JP | 2011-244417 A | | 12/2011 | |
| JP | 2013144536 A | | 7/2013 | |
| JP | 2015-137070 A | | 7/2015 | |
| JP | 2015-231765 A | | 12/2015 | |
| JP | 2016-172486 A | | 9/2016 | |
| JP | 2016-187990 A | | 11/2016 | |
| JP | 2017-081532 A | | 5/2017 | |
| KR | 2015-0130190 A | | 11/2015 | |
| WO | 2015-157744 A1 | | 10/2015 | |

OTHER PUBLICATIONS

International Search Report issued in corresponding International Application No. PCT/JP2018/022415 dated Aug. 21, 2018 (11 pages).
Written Opinion issued in corresponding International Application No. PCT/JP2018/022415 dated Aug. 21, 2018 (8 pages).
Office Action issued in U.S. Appl. No. 16/622,118; dated Nov. 29, 2021 (11 pages).
Advisory Action issued in U.S. Appl. No. 16/622,118; dated Feb. 11, 2022 (7 pages).
Office Action issued in U.S. Appl. No. 16/622,118 dated Apr. 8, 2022 (26 pages).
Office Action issued in corresponding Japanese Application No. JP 2019-525239 dated Feb. 8, 2022 (13 pages).

\* cited by examiner

FIG. 4

| OBJECT TO BE CLEANED | FRONT/REAR WINDOW | EXTERNAL SENSOR | HEADLAMP | SUITABLE TIME PERIOD | SUITABLE DRIVING MODE |
|---|---|---|---|---|---|
| CLEANER TYPE | WW | LC, CAMERA CLEANER | HC | | |
| MODE A | 4/4 | 2/4 | 1/4 | DAY-TIME | DRIVING ASSISTANCE |
| MODE B | 4/4 | 1/4 | 2/4 | DAY-TIME | MANUAL DRIVING |
| MODE C | 2/4 | 4/4 | 1/4 | DAY-TIME | FULLY AUTOMATIC DRIVING, ADVANCED DRIVING ASSISTANCE, DRIVING ASSISTANCE |
| MODE D | 2/4 | 1/4 | 4/4 | NIGHT-TIME | MANUAL DRIVING |
| MODE E | 1/4 | 4/4 | 2/4 | NIGHT-TIME | FULLY AUTOMATIC DRIVING, ADVANCED DRIVING ASSISTANCE |
| MODE F | 1/4 | 2/4 | 4/4 | NIGHT-TIME | FULLY AUTOMATIC DRIVING, ADVANCED DRIVING ASSISTANCE |
| MODE G | 4/4 | 4/4 | 2/4 | DAY-TIME | FULLY AUTOMATIC DRIVING, ADVANCED DRIVING ASSISTANCE, DRIVING ASSISTANCE, MANUAL DRIVING |
| MODE H | 4/4 | 2/4 | 4/4 | NIGHT-TIME | MANUAL DRIVING |
| MODE I | 2/4 | 4/4 | 4/4 | NIGHT-TIME | FULLY AUTOMATIC DRIVING, ADVANCED DRIVING ASSISTANCE |

4/4: 4 OPERATIONS PER 4 CLEANER OPERATION SIGNALS
2/4: 2 OPERATIONS PER 4 CLEANER OPERATION SIGNALS
1/4: 1 OPERATION PER 4 CLEANER OPERATION SIGNALS

FIG. 5
MODE A
CLEANER OPERATION SIGNAL
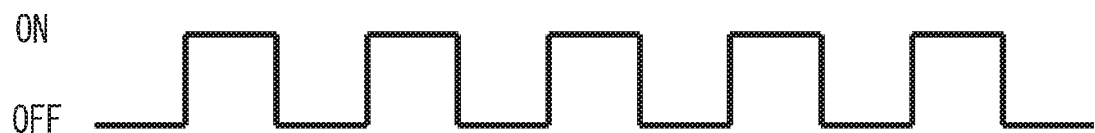
WINDOW WASHER
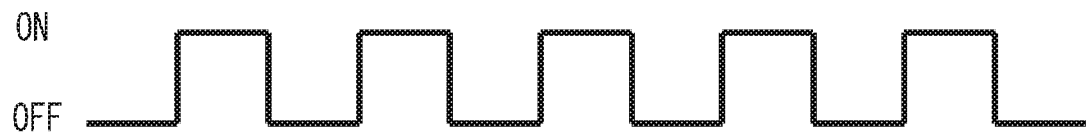
LiDAR CLEANER, CAMERA CLEANER
HEADLAMP CLEANER

FIG. 10
MODE F
CLEANER OPERATION SIGNAL
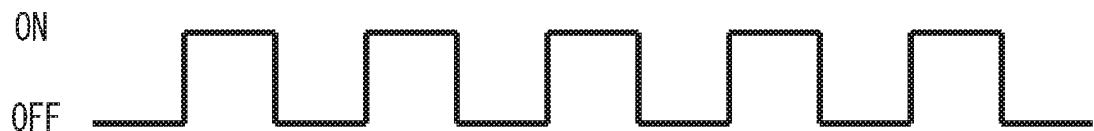
WINDOW WASHER
LiDAR CLEANER, CAMERA CLEANER
HEADLAMP CLEANER
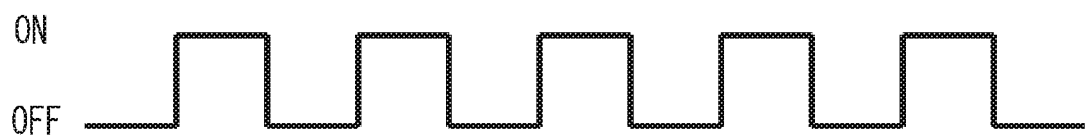

FIG. 11
MODE G
CLEANER OPERATION SIGNAL
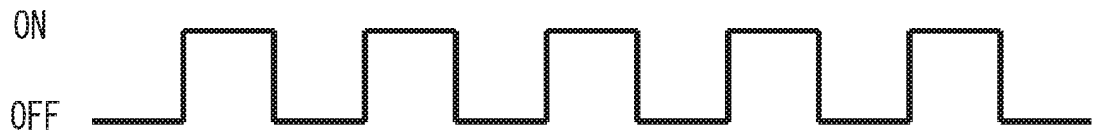
WINDOW WASHER
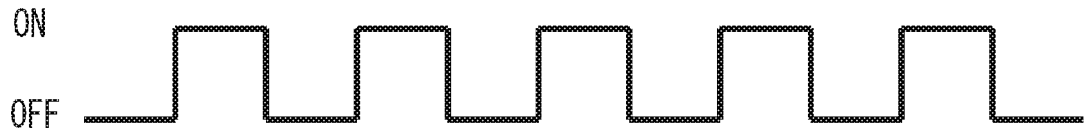
LiDAR CLEANER, CAMERA CLEANER
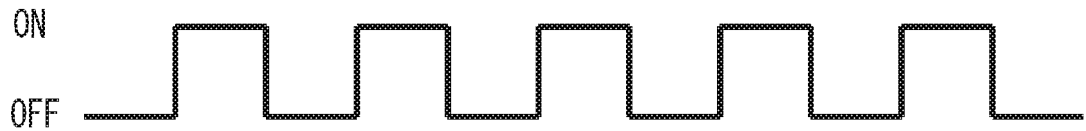
HEADLAMP CLEANER

FIG. 12
MODE H
CLEANER OPERATION SIGNAL
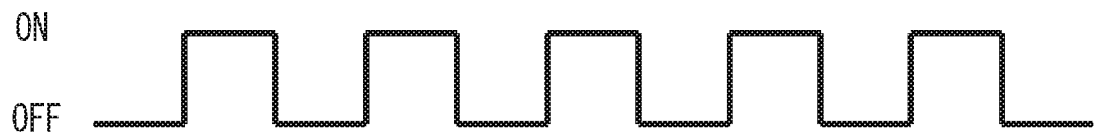
WINDOW WASHER
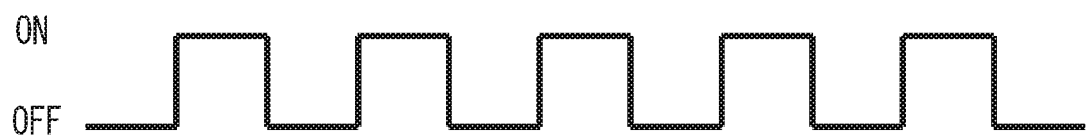
LiDAR CLEANER, CAMERA CLEANER
HEADLAMP CLEANER
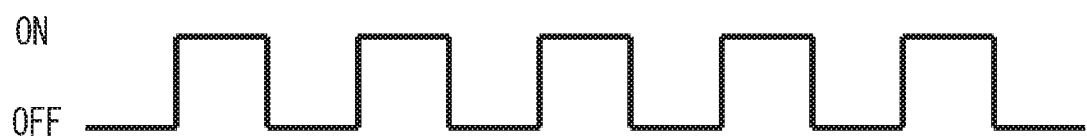

FIG. 13
MODE I
CLEANER OPERATION SIGNAL
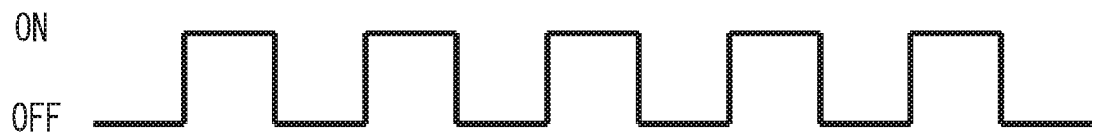
WINDOW WASHER
LiDAR CLEANER, CAMERA CLEANER
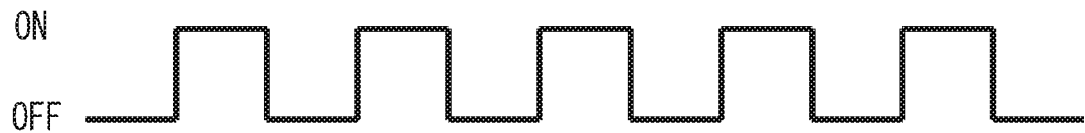
HEADLAMP CLEANER
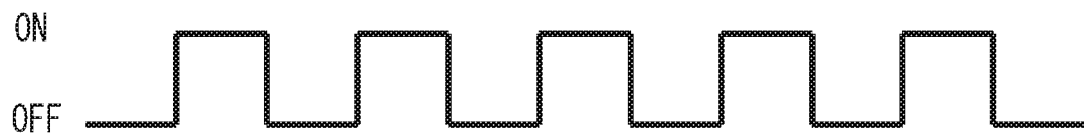

FIG. 14

| CLEANER TYPE | | FRONT LC | CAMERA CLEANER | REAR LC | LEFT/RIGHT LC |
|---|---|---|---|---|---|
| MODE | MODE 1 | 8/8 | 8/8 | 8/8 | 8/8 |
| | MODE 2 | 8/8 | 8/8 | 8/8 | 4/8 |
| | MODE 3 | 8/8 | 8/8 | 4/8 | 8/8 |
| | MODE 4 | 8/8 | 8/8 | 4/8 | 2/8 |
| | MODE 5 | 8/8 | 8/8 | 2/8 | 4/8 |
| | MODE 6 | 8/8 | 4/8 | 2/8 | 2/8 |
| | MODE 7 | 8/8 | 4/8 | 1/8 | 1/8 |
| | MODE 8 | 8/8 | 4/8 | 2/8 | 2/8 |
| | MODE 9 | 4/8 | 8/8 | 2/8 | 2/8 |
| | MODE 10 | 4/8 | 8/8 | 1/8 | 1/8 |
| | MODE 11 | 4/8 | 8/8 | 1/8 | 2/8 |

8/8: 8 OPERATIONS PER 8 CLEANER OPERATION SIGNALS
4/8: 4 OPERATIONS PER 8 CLEANER OPERATION SIGNALS
2/8: 2 OPERATIONS PER 8 CLEANER OPERATION SIGNALS
1/8: 1 OPERATION PER 8 CLEANER OPERATION SIGNALS

FIG. 15

| OBJECT TO BE CLEANED | FRONT/REAR WINDOW | EXTERNAL SENSOR | | | | LAMP |
|---|---|---|---|---|---|---|
| CLEANER TYPE | WW | FRONT LC | CAMERA CLEANER | REAR LC | LEFT/RIGHT LC | HC |
| MODE | MODE 15 | 4/8 | 8/8 | 8/8 | 2/8 | 4/8 | 8/8 |

8/8: 8 OPERATIONS PER 8 CLEANER OPERATION SIGNALS
4/8: 4 OPERATIONS PER 8 CLEANER OPERATION SIGNALS
2/8: 2 OPERATIONS PER 8 CLEANER OPERATION SIGNALS

VEHICLE CLEANER SYSTEM AND VEHICLE INCLUDING VEHICLE CLEANER SYSTEM

TECHNICAL FIELD

The present invention relates to a vehicle cleaner system.
The present invention also relates to a vehicle cleaner system configured to clean an object to be cleaned and a vehicle including the vehicle cleaner system.

BACKGROUND ART

A headlamp cleaner for a vehicle is known in Patent Literature 1 and the like.

CITATION LIST

Patent Literature

[PTL 1] JP-A-2016-187990

SUMMARY OF INVENTION

Technical Problem

In recent years, attempts have been made to develop vehicles that can be automatically driven. In order to realize automatic driving, sensitivity of a LiDAR, a camera and the like is required to be kept well. Accordingly, sensor cleaners that clean these sensors are required.

An object of the present invention is to provide a user-friendly vehicle cleaner system in which a window washer, a headlamp cleaner, and a sensor cleaner are mounted.

In addition to cleaning a headlamp, a cleaner that cleans a sensor such as a LiDAR or a camera is required.

An object of the present invention is to provide a user-friendly vehicle cleaner system including a sensor cleaner.

In order to realize automatic driving, sensitivity of an in-vehicle sensor such as a LiDAR or a camera is required to kept well. Accordingly, sensors cleaner that clean these in-vehicle sensors are required. Although a window washer that cleans a window shield and a sensor cleaner require different cleaning methods, when pumps are respectively provided for the plurality of objects to be cleaned, the system becomes complicated and cost increases.

An object of the present invention to provide a user-friendly vehicle cleaner system and a vehicle including the vehicle cleaner system while reducing cost.

Solution to Problem

A vehicle cleaner system according to an aspect of the present invention includes:
a window washer configured to clean a front window of a vehicle;
a lamp cleaner configured to clean a headlamp;
a sensor cleaner configured to clean a sensor that detects information outside the vehicle; and
a cleaner control unit configured to operate at least one of the window washer, the lamp cleaner, and the sensor cleaner in accordance with input of a signal.

The cleaner control unit is configured to operate the window washer, the lamp cleaner, and the sensor cleaner such that at least two or more of a number of operations of the window washer, a number of operations of the lamp cleaner, and a number of operations of the sensor cleaner are different in accordance with a predetermined number of signals.

A vehicle cleaner system according to another aspect of the present invention includes:
a sensor cleaner configured to clean a sensor capable of acquiring information around a vehicle;
an operation unit operable by a user and configured to output a signal in accordance with an operation of the user; and
a control unit capable of executing an automatic cleaning mode for operating the sensor cleaner regardless of the signal output from the operation unit.

The control unit is configured to operate the sensor cleaner when a signal is input from the operation unit during execution of the automatic cleaning mode.

A vehicle cleaner system according to another aspect of the present invention includes:
a sensor cleaner configured to clean a LiDAR mounted on a vehicle;
a window washer configured to clean a window of the vehicle; and
a control unit configured to operate the sensor cleaner in accordance with an operation of the window washer.

A vehicle cleaner system according to another aspect of the present invention is a vehicle cleaner system configured to clean an object to be cleaned. The vehicle cleaner system includes:
a single pump;
a pump control unit configured to control the single pump;
a cleaner including a plurality of nozzles connected to the single pump and configured to clean a plurality of objects to be cleaned by a cleaning medium;
a pipeline connecting the single pump and the plurality of nozzles; and
an injection operation unit configured to control injection of the cleaning medium from each nozzle toward the object to be cleaned.

The pump control unit constantly is configured to pressurize the cleaning medium in the pipeline by the single pump.

The vehicle cleaner system further includes an injection operation unit control unit configured to operate the injection operation unit to inject the cleaning medium from each nozzle.

According to the vehicle cleaner system of the present disclosure, since the cleaning medium can be injected only from required ones of the plurality of nozzles, components required by the scene is easily kept clean while saving the cleaning medium. Therefore, it is possible to provide a user-friendly vehicle cleaner system while reducing cost.

In the vehicle cleaner system according to the present invention,
the injection operation unit control unit may have an individual control mode capable of individually controlling injection of the cleaning medium from each nozzle, a partial interlock mode capable of interlockingly controlling injection of the cleaning medium from two or more specific nozzles, and an overall interlock mode capable of interlockingly controlling injection of the cleaning medium from all nozzles.

Different cleaning modes are provided depending on the scene in which the cleaner is used, and cleaning efficiency can be further enhanced.

In the vehicle cleaner system according to the present invention, a check valve is further provided at a branch portion for branching the pipeline toward each nozzle.

The injection operation portion may be disposed between each nozzle and the check valve.

By providing the check valve, the cleaning medium can be easily pressurized between the injection operation unit and the check valve.

In the vehicle cleaner system according to the present invention, at least one of the plurality of nozzles may be different from at least one of the other nozzles in at least one of a shape of an opening thereof, an injection amount, an injection pressure, injection time, the number of injections, an injection shape, and injection area of the cleaning medium.

For example, by varying the injection method of the cleaning medium among the plurality of nozzles as described above, each object to be cleaned can be cleaned with an appropriate cleaning method at low cost.

In the vehicle cleaner system according to the present invention, the object to be cleaned may be at least one of a window shield of a vehicle, a vehicle lamp, and a sensor that detects information outside the vehicle.

The vehicle cleaner system is particularly preferably applied to these objects to be cleaned.

A vehicle including the vehicle cleaner system according to the present invention includes:

the vehicle cleaner system having any one of the above configurations.

According to the above configurations, it is possible to provide a vehicle including a user-friendly vehicle cleaner system while reducing cost.

Advantageous Effects of Invention

According to one aspect of the present invention there is provided a user-friendly vehicle cleaner system in which a window washer, a headlamp cleaner, and a sensor cleaner are provided.

According to another aspect of the present invention there is provided a user-friendly vehicle cleaner system including a sensor cleaner.

According to another aspect of the present invention, it is possible to provide a user-friendly vehicle cleaner system and a vehicle including the vehicle cleaner system while reducing cost.

BRIEF DESCRIPTION OF DRAWINGS

FIG. 4 is a table showing modes A to I according to a first embodiment.

FIG. 5 is a timing chart of the mode A.
FIG. 10 is a timing chart of the mode F.
FIG. 11 is a timing chart of the mode G.
FIG. 12 is a timing chart of the mode H.
FIG. 13 is a timing chart of the mode I.
FIG. 14 is a table showing modes 1 to 11.
FIG. 15 is a table showing a mode I5.

DESCRIPTION OF EMBODIMENTS

Figure 1:
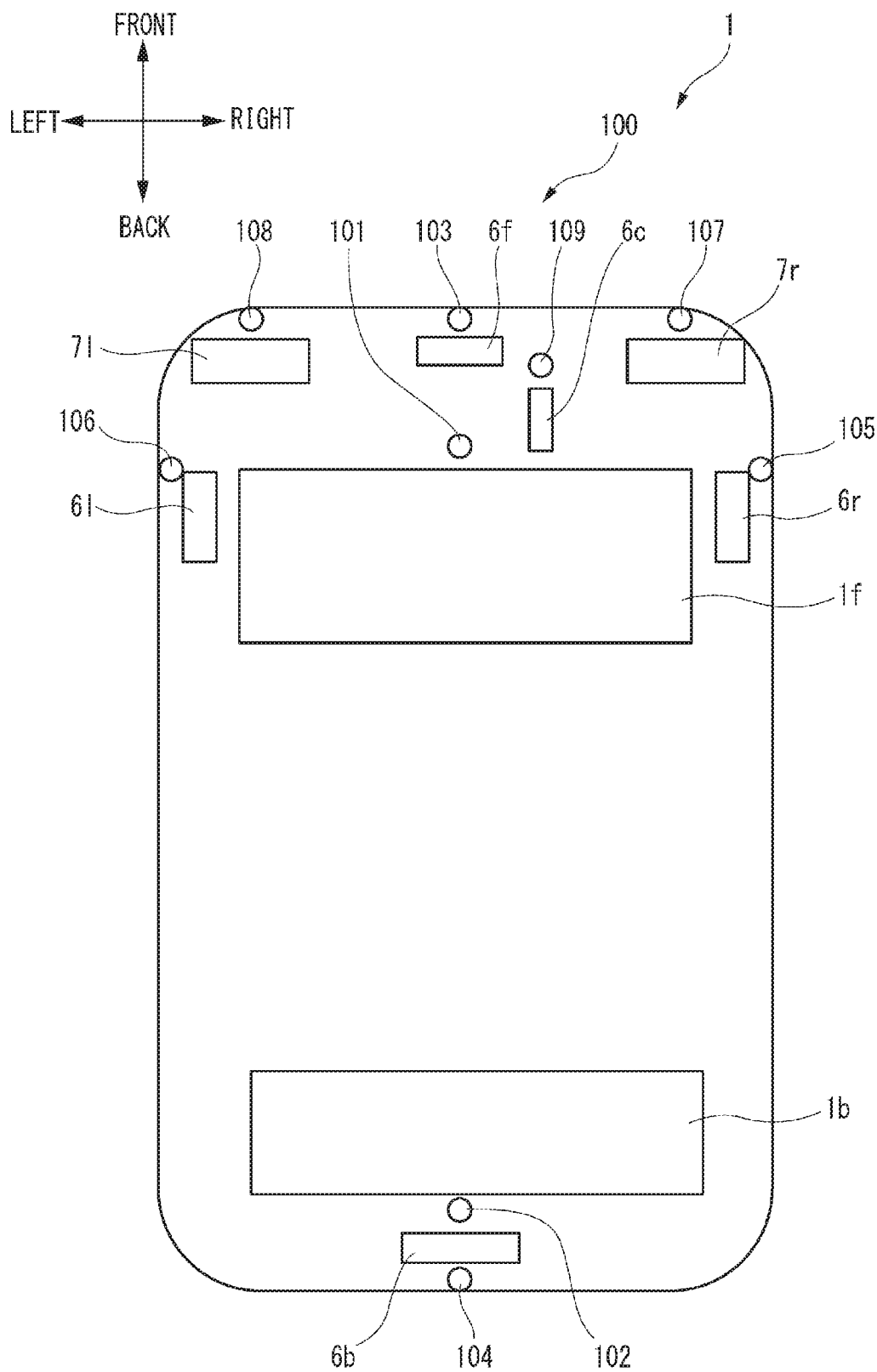
FIG. 1 is a top view of a vehicle including a vehicle cleaner system according to first to third embodiments.

Hereinafter, embodiments of the present invention will be described with reference to the drawings. Incidentally, in description of the present embodiment, members having the same reference numerals as those already described are not described for convenience of description. Dimensions of members shown in the drawings may be different from those of actual members for convenience of description.

In addition, in the description of the present embodiment, a "left-right direction", a "front-back direction", and an "up-down direction" are appropriately referred to for convenience of description. These directions are relative directions set for a vehicle 1 shown in FIG. 1. Here, the "up-down direction" includes an "up direction" and a "down direction". The "front-back direction" includes a "front direction" and a "back direction". The "left-right direction" includes a "left direction" and a "right direction".

FIG. 1 is a top view of the vehicle 1 including a vehicle cleaner system 100 (hereinafter referred to as a cleaner system 100) according to first to third embodiments. The vehicle 1 includes the cleaner system 100. In the present embodiment, the vehicle 1 is an automobile that can travel in an automatic driving mode.

Figure 2:
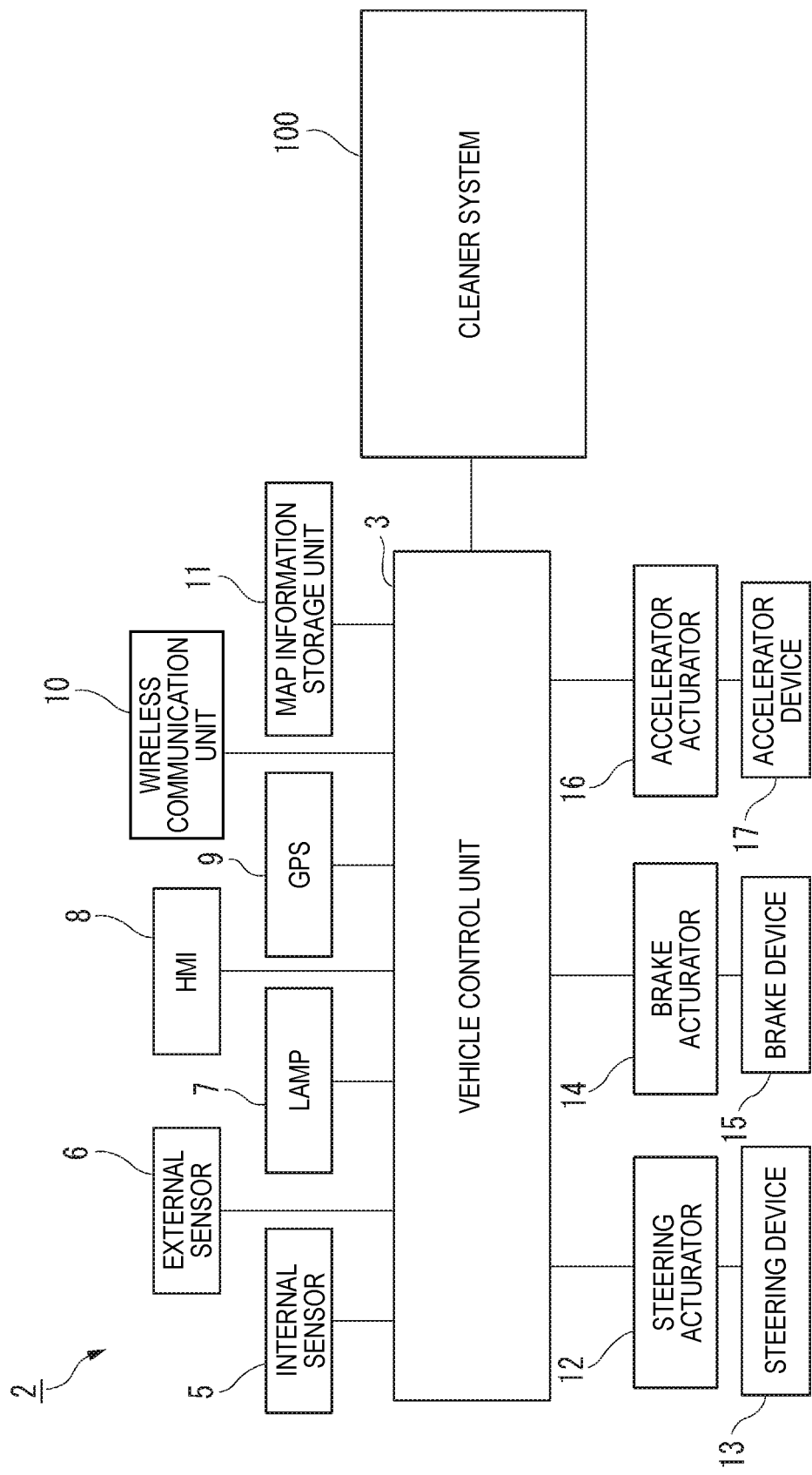
FIG. 2 is a block diagram of a vehicle system.

First, a vehicle system 2 of the vehicle 1 will be described with reference to FIG. 2. FIG. 2 is a block diagram of the vehicle system 2. As shown in FIG. 2, the vehicle system 2 includes a vehicle control unit 3, an internal sensor 5, an external sensor 6, a lamp 7 (an example of a vehicle lamp), a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 is configured by an electronic control unit (ECU). The vehicle control unit 3 includes a processor such as a central processing unit (CPU), a read only memory (ROM) in which various vehicle control programs are stored, and a random access memory (RAM) in which various vehicle control data are temporarily stored. The processor is configured to load a program designated from various vehicle control programs stored in the ROM onto the RAM and execute various processing in cooperation with the RAM. The vehicle control unit 3 is configured to control traveling of the vehicle 1.

The internal sensor 5 is a sensor that can acquire information on an own vehicle. The internal sensor 5 is, for example, at least one of an acceleration sensor, a speed sensor, a wheel speed sensor, and a gyro sensor. The internal sensor 5 is configured to acquire information on the own vehicle including a traveling state of the vehicle 1 and to output the information to the vehicle control unit 3.

The internal sensor 5 may further include a seating sensor that detects whether a driver is seated in a driver seat, a face direction sensor that detects a direction of a face of the driver, an external weather sensor that detects external weather conditions, a human sensor that detects whether people are in the vehicle, and the like. Further, the internal sensor 5 may include an illuminance sensor that detects illuminance of a surrounding environment of the vehicle 1.

The external sensor 6 is a sensor that can acquire information outside the own vehicle. The external sensor 6 is, for example, at least one of a camera, a radar, and a LiDAR. The external sensor 6 is configured to acquire information outside the own vehicle including the surrounding environment of the vehicle 1 (other vehicles, pedestrians, road shapes, traffic signs, obstacles and the like) and to output the information to the vehicle control unit 3.

The camera is, for example, a camera including an image sensor such as a charge-coupled device (CCD) or a complementary MOS (CMOS). The camera is a camera that detects visible light or an infrared camera that detects infrared rays.

The radar is, for example, a millimeter-wave radar, a microwave radar, or a laser radar.

The LiDAR is an abbreviation for light detection and ranging, or laser imaging detection and ranging. The LiDAR is a sensor that generally emits invisible light forward and acquires information such as a distance to an object, a shape of the object, a material of the object, a color of the object, and the like based on the emitted light and the returned light.

Alternatively, the external sensor 6 may include a weather sensor that detects weather conditions, an illuminance sensor that detects illuminance of the surrounding environment of the vehicle 1, and the like.

The lamp 7 is at least one of a headlamp or a position lamp provided in a front portion of the vehicle 1, a rear combination lamp provided in a back portion of the vehicle 1, a turn signal lamp provided in the front portion or a lateral portion of the vehicle 1, and various lamps that inform pedestrians and drivers of other vehicles of a situation of the own vehicle.

The HMI 8 includes an input unit that receives an input operation from the driver and an output unit that outputs traveling information or the like to the driver. The input unit includes a steering wheel, an accelerator pedal, a brake pedal, a driving mode switching switch that switches a driving mode of the vehicle 1, and the like. The output unit is a display that displays various traveling information.

The GPS 9 is configured to acquire current position information on the vehicle 1 and to output the acquired current position information to the vehicle control unit 3. The wireless communication unit 10 is configured to receive traveling information on other vehicles around the vehicle 1 from other vehicles and to transmit the traveling information on the vehicle 1 to other vehicles (inter-vehicle communication). The wireless communication unit 10 is configured to receive infrastructure information from infrastructure equipment such as a traffic light or a beacon light and to transmit the traveling information on the vehicle 1 to the infrastructure equipment (road-to-vehicle communication). The map information storage unit 11 is an external storage device such as a hard disk drive in which map information is stored, and is configured to output the map information to the vehicle control unit 3.

When the vehicle 1 travels in the automatic driving mode, the vehicle control unit 3 automatically generates at least one of a steering control signal, an accelerator control signal, and a brake control signal based on the traveling state information, the surrounding environment information, the current position information, the map information or the like. The steering actuator 12 is configured to receive the steering control signal from the vehicle control unit 3 and to control the steering device 13 based on the received steering control signal. The brake actuator 14 is configured to receive the brake control signal from the vehicle control unit 3 and to control the brake device 15 based on the received brake control signal. The accelerator actuator 16 is configured to receive the accelerator control signal from the vehicle control unit 3 and to control the accelerator device 17 based on the received accelerator control signal. In this way, in the automatic driving mode, the traveling of the vehicle 1 is automatically controlled by the vehicle system 2.

On the other hand, when the vehicle 1 travels in a manual driving mode, the vehicle control unit 3 generates a steering control signal, an accelerator control signal, and a brake control signal according to a manual operation of the driver on the accelerator pedal, the brake pedal, and the steering wheel. In this way, in the manual driving mode, since the steering control signal, the accelerator control signal, and the brake control signal are generated by the manual operation of the driver, the driving of the vehicle 1 is controlled by the driver.

The driving mode of the vehicle 1 will be described. The driving mode includes the automatic driving mode and the manual driving mode. The automatic driving mode includes a fully automatic driving mode, an advanced driving assistance mode, and a driving assistance mode. In the fully automatic driving mode, the vehicle system 2 automatically performs all traveling controls including steering control, brake control, and accelerator control, and the driver is not in a state where the vehicle 1 can be driven. In the advanced driving assistance mode, the vehicle system 2 automatically performs all the traveling controls including the steering control, the brake control, and the accelerator control, and the driver does not drive the vehicle 1 although the vehicle 1 can be driven. In the driving assistance mode, the vehicle system 2 automatically performs some of the traveling controls including the steering control, the brake control, and the accelerator control, and the driver drives the vehicle 1 under driving assistance of the vehicle system 2. On the other hand, in the manual driving mode, the vehicle system 2 does not automatically perform the traveling controls, and the driver drives the vehicle 1 without the driving assistance of the vehicle system 2.

The driving mode of the vehicle 1 may be switched by operating the driving mode switching switch. In this case, the vehicle control unit 3 switches the driving mode of the vehicle 1 between the four driving modes (the fully automatic driving mode, the advanced driving assistance mode, the driving assistance mode, and the manual driving mode) in accordance with operation of the driver on the driving mode switching switch. The driving mode of the vehicle 1 may be automatically switched based on information on travel-permitted sections where autonomous vehicles can travel and travel-prohibited sections where traveling of the autonomous vehicles is prohibited, or information on external weather conditions. In this case, the vehicle control unit 3 switches the driving mode of the vehicle 1 based on these pieces of information. Further, the driving mode of the vehicle 1 may be automatically switched by using the seating sensor, the face direction sensor, or the like. In this case, the vehicle control unit 3 switches the driving mode of the vehicle 1 based on an output signal from the seating sensor or the face direction sensor.

Referring back to FIG. 1, the vehicle 1 includes a front LiDAR 6f, a rear LiDAR 6b, a right LiDAR 6r, a left LiDAR 6l, and a camera 6c as the external sensor 6. The front LiDAR 6f is configured to acquire information on a front side of the vehicle 1. The rear LiDAR 6b is configured to acquire information on a back side of the vehicle 1. The right LiDAR 6r is configured to acquire information on a right side of the vehicle 1. The left LiDAR 6l is configured to acquire information on a left side of the vehicle 1. The camera 6c is configured to acquire information on the front side of the vehicle 1.

In the example shown in FIG. 1, the front LiDAR 6f is provided in the front portion of the vehicle 1, the rear LiDAR 6b is provided in the back portion of the vehicle 1, the right LiDAR 6r is provided in a right portion of the vehicle 1, and the left LiDAR 6l is provided in a left portion of the vehicle 1. However, the present invention is not limited to this example. For example, the front LiDAR, the rear LiDAR, the right LiDAR, and the left LiDAR may be collectively disposed on a ceiling of the vehicle 1.

The vehicle 1 includes a right headlamp 7r and a left headlamp 7l as a lamp 7. The right headlamp 7r is provided in a right portion of the front portion of the vehicle 1, and the left headlamp 7l is provided in a left portion of the front portion of the vehicle 1. The right headlamp 7r is provided rightward than the left headlamp 7l.

The vehicle 1 includes a front window 1f and a rear window 1b.

The vehicle 1 includes the cleaner system 100. The cleaner system 100 is a system configured to clean objects to be cleaned provided outside a vehicle interior, that is, to remove foreign matters such as water droplets, mud, dust, and the like adhering to these objects to be cleaned using a cleaning medium. In the present embodiment, the cleaner system 100 includes a front window washer (hereinafter referred to as a front WW) 101, a rear window washer (hereinafter referred to as a rear WW) 102, a front LiDAR cleaner (hereinafter referred to as a front LC) 103, a rear LiDAR cleaner (hereinafter referred to as a rear LC) 104, a right LiDAR cleaner (hereinafter referred to as a right LC) 105, a left LiDAR cleaner (hereinafter referred to as a left LC) 106, a right headlamp cleaner (hereinafter referred to as a right HC) 107, a left headlamp cleaner (hereinafter referred to as a left HC) 108, and a camera cleaner 109. Each of cleaners 101 to 109 has one or more nozzles, and discharges the cleaning medium such as cleaning liquid or air from the nozzles toward an object to be cleaned.

The front WW 101 can be used for cleaning the front window 1f. The rear WW 102 can be used for cleaning the rear window 1b. The front LC 103 is capable of cleaning the front LiDAR 6f. The rear LC 104 is capable of cleaning the rear LiDAR 6b. The right LC 105 is capable of cleaning the right LiDAR 6r. The left LC 106 is capable of cleaning the left LiDAR 6l. The right HC 107 is capable of cleaning the right headlamp 7r. The left HC 108 is capable of cleaning the left headlamp 7l. The camera cleaner 109 is capable of cleaning the camera 6c.

Figure 3:
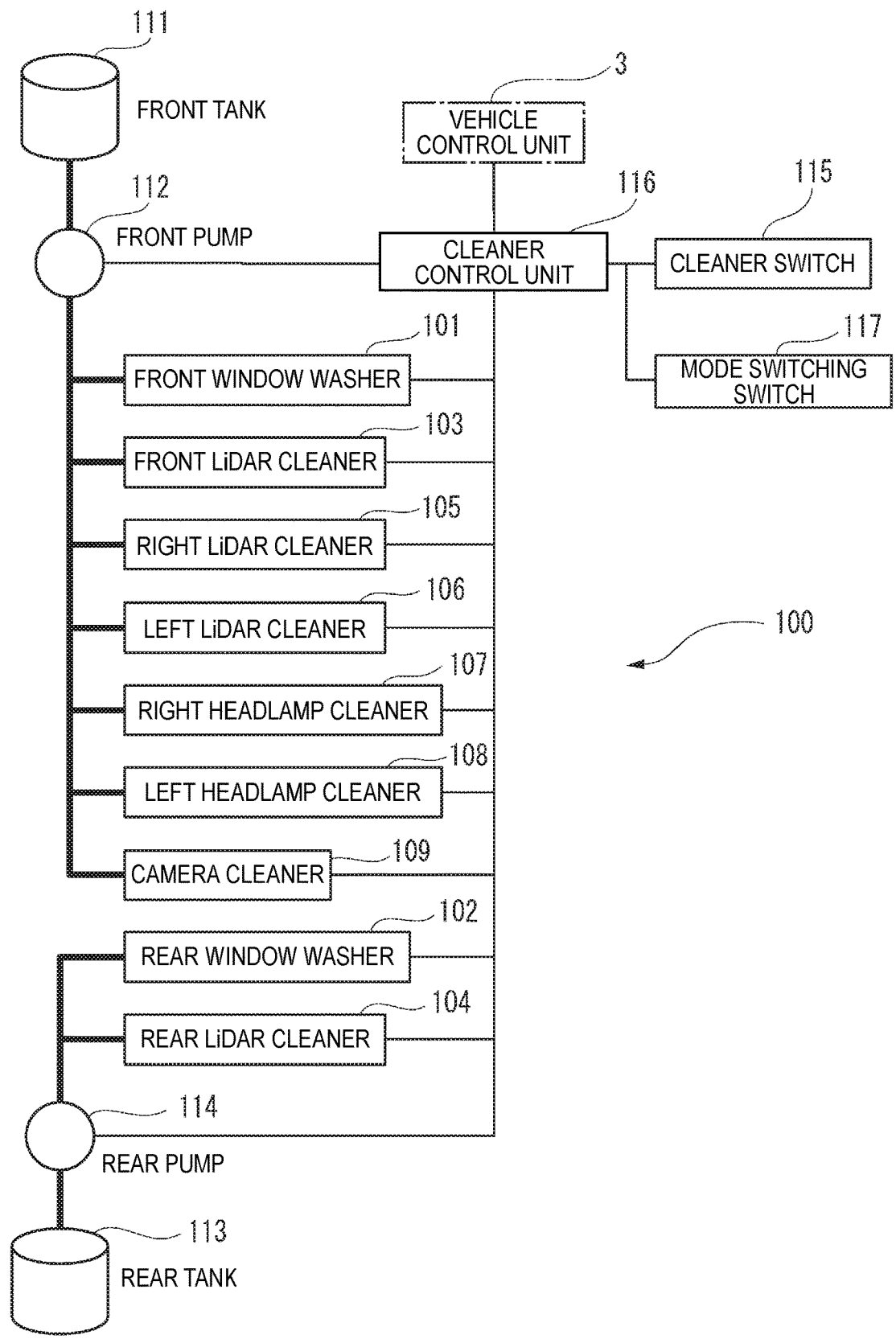
FIG. 3 is a block diagram of the cleaner system.

FIG. 3 is a block diagram of the cleaner system. In addition to the cleaners 101 to 109, the cleaner system includes a front tank 111, a front pump 112, a rear tank 113, a rear pump 114, a cleaner switch 115, a cleaner control unit 116 (a control unit), and a mode switching switch 117.

The front WW 101, the front LC 103, the right LC 105, the left LC 106, the right HC 107, the left HC 108, and the camera cleaner 109 are connected to the front tank 111 via the front pump 112. The front pump 112 sends a cleaning liquid stored in the front tank 111 to the front WW 101, the front LC 103, the right LC 105, the left LC 106, the right HC 107, the left HC 108, and the camera cleaner 109.

The rear WW 102 and the rear LC 104 are connected to the rear tank 113 via the rear pump 114. The rear pump 114 sends a cleaning liquid stored in the rear tank 113 to the rear WW 102 and the rear LC 104.

The cleaner switch 115 (an example of an operation unit) is a device provided inside the vehicle interior of the vehicle 1 and operable by a user. The cleaner switch 115 outputs a cleaner operation signal in response to an operation by the user, and the cleaner operation signal is input to the cleaner control unit 116.

Each of the cleaners 101 to 109 is provided with an actuator that opens the nozzle to discharge the cleaning liquid to the object to be cleaned. The actuator provided in each of the cleaners 101 to 109 is electrically connected to the cleaner control unit 116. The cleaner control unit 116 is also electrically connected to the front pump 112, the rear pump 114, the cleaner switch 115, and the vehicle control unit 3.

When a signal for operating the cleaner system 100 is input, the cleaner control unit 116, for example, operates the front pump 112 to send the cleaning liquid from the front tank 111 to the front WW 101, and operates the actuator of the front WW 101 to discharge the cleaning liquid from the front WW 101.

For example, the cleaner control unit 116 transmits an electric signal to the front pump 112 and operates the front pump 112 to send the cleaning liquid from the front tank 111 to the front WW 101, and transmits an electric signal to the actuator of the front WW 101 to discharge the cleaning liquid from the front WW 101.

In the present embodiment, the vehicle control unit 3 may transmit a cleaner operation signal for operating the cleaner system 100. The cleaner operation signal is input to the cleaner control unit 116. When the cleaner operation signal is input to the cleaner control unit 116, the cleaner control unit 116, for example, transmits a window washer operation signal (hereinafter referred to as a WW signal) to the actuator of the front WW 101 to discharge the cleaning liquid from the front WW 101. For example, the cleaner control unit 116 transmits an electric signal to the actuator of the front LC 103 to discharge the cleaning liquid from the front LC 103. At this time, if necessary, an electric signal is transmitted to the front pump 112 to operate the front pump 112, and the cleaning liquid is sent from the front tank 111 to the front WW 101 and the front LC 103.

The cleaner operation signal may be transmitted by the vehicle control unit 3 as described above, or the cleaner operation signal may be transmitted by the cleaner switch 115 operable by the user.

In some cases, the user does not want to carelessly operate the sensor cleaners 103 to 106, 109. For example, when a remaining amount in the front tank 111 or the rear tank 113 is small, the cleaner system 100 is performing cleaning while saving the cleaning liquid in an automatic cleaning mode.

Accordingly, in the present embodiment, the cleaner system 100 can be set to an interrupt prohibition mode at any timing. For example, a button operated by the user or the vehicle control unit 3 may be configured to be able to transmit an electric signal for setting the cleaner control unit 116 to the interrupt prohibition mode. Alternatively, the cleaner control unit 116 may be configured to set itself to the interrupt prohibition mode based on some condition determination. While the interrupt prohibition mode is set, the cleaner control unit 116 does not operate the various cleaners 101 to 109 even when the user operates the cleaner switch 115. In this way, the cleaner system 100 according to the present embodiment can set a mode in which the sensor cleaners 103 to 106, 109 do not operate even when the user operates the cleaner switch 115, and can flexibly cope with various situations.

<Operation of Cleaner System According to First Embodiment>

Next, an operation of the cleaner system 100 according to the first embodiment will be described.

The cleaner control unit 116 is configured to operate at least one of the WWs 101 to WW 102, the HC 107, 108, and the sensor cleaners 103 to 106, 109 when a cleaner operation signal for operating the cleaner system 100 is input. For example, when an occupant operates the cleaner switch 115 provided inside the vehicle interior, a cleaner operation signal is input to the cleaner control unit 116. Alternatively, the vehicle control unit 3 appropriately transmits the cleaner operation signal to the cleaner control unit 116. For example, when the vehicle control unit 3 determines that the camera 6c is dirty, the vehicle control unit 3 transmits a cleaner operation signal to the cleaner control unit 116. Alternatively, the vehicle control unit 3 transmits the cleaner operation signal to the cleaner control unit 116 at predetermined intervals.

FIG. 4 shows modes A to I that the cleaner system 100 according to the present embodiment can take. The cleaner control unit 116 is configured to be able to switch the modes A to I shown in FIG. 4. When a predetermined number of cleaner operation signals are input to the cleaner control unit 116, a mode defines the number of operations of the cleaners 101 to 109 by the cleaner control unit 116.

When objects to be cleaned are grouped into front and rear windows 1f, 1b, external sensor 6 and lamp 7, the modes A to I define the number of operations of the WWs 101, 102, the LCs 103 to 106, and the camera cleaner 109, HCs 107, 108 for respectively cleaning the objects to be cleaned, with respect to the input number of the cleaner operation signals.

Although the present embodiment describes a mode in which the front WW 101 that cleans the front window 1f and the rear WW 102 that cleans the rear window 1b are simultaneously operated, the cleaner control unit 116 may be configured to be able to select a mode in which the front WW 101 and the rear WW 102 are operated at different timings.

(Mode A)

The mode A is a mode in which the front and rear windows 1f, 1b, the external sensor 6, and the lamp 7 are preferentially cleaned in this order. FIG. 5 shows a timing chart when the cleaner control unit 116 executes the mode A.

As shown in FIGS. 4 and 5, the WWs 101, 102 that clean the front and rear windows 1f, 1b are operated four times when a cleaner operation signal is input four times. The WWs 101, 102 are operated each time the cleaner operation signal is input to the cleaner control unit 116.

The LCs 103 to 106 and the camera cleaner 109 that clean the external sensor 6 are operated twice when the cleaner operation signal is input four times. The LCs 103 to 106 and the camera cleaner 109 are not operated even when first and third cleaner operation signals are input, and are operated when second and fourth cleaner operation signals are input.

The HCs 107, 108 that clean the lamp 7 are operated once when the cleaner operation signal is input four times. The HCs 107, 108 are not operated even when the first to third cleaner operation signals are input, and are operated when the fourth cleaner operation signal is input.

According to the mode A, the front window 1f is preferentially cleaned, and a vision field of the occupant is easily kept well at all times. Therefore, the mode A is suitable when the occupant drives the vehicle 1.

According to the mode A, the priority of cleaning the external sensor 6 is lower than that of the front window 1f but higher than that of the lamp 7. Therefore, the mode A is suitable when the vehicle control unit 3 is executing a driving mode using the external sensor 6.

According to the mode A, the priority of cleaning the lamp 7 is the lowest. Therefore, the mode A is suitable for daytime use in which the lamp 7 is not actively used.

As described above, the mode A is suitable when the vehicle 1 travels in daytime and the vehicle control unit 3 executes the driving assistance mode.

(Mode B)

Figure 6:
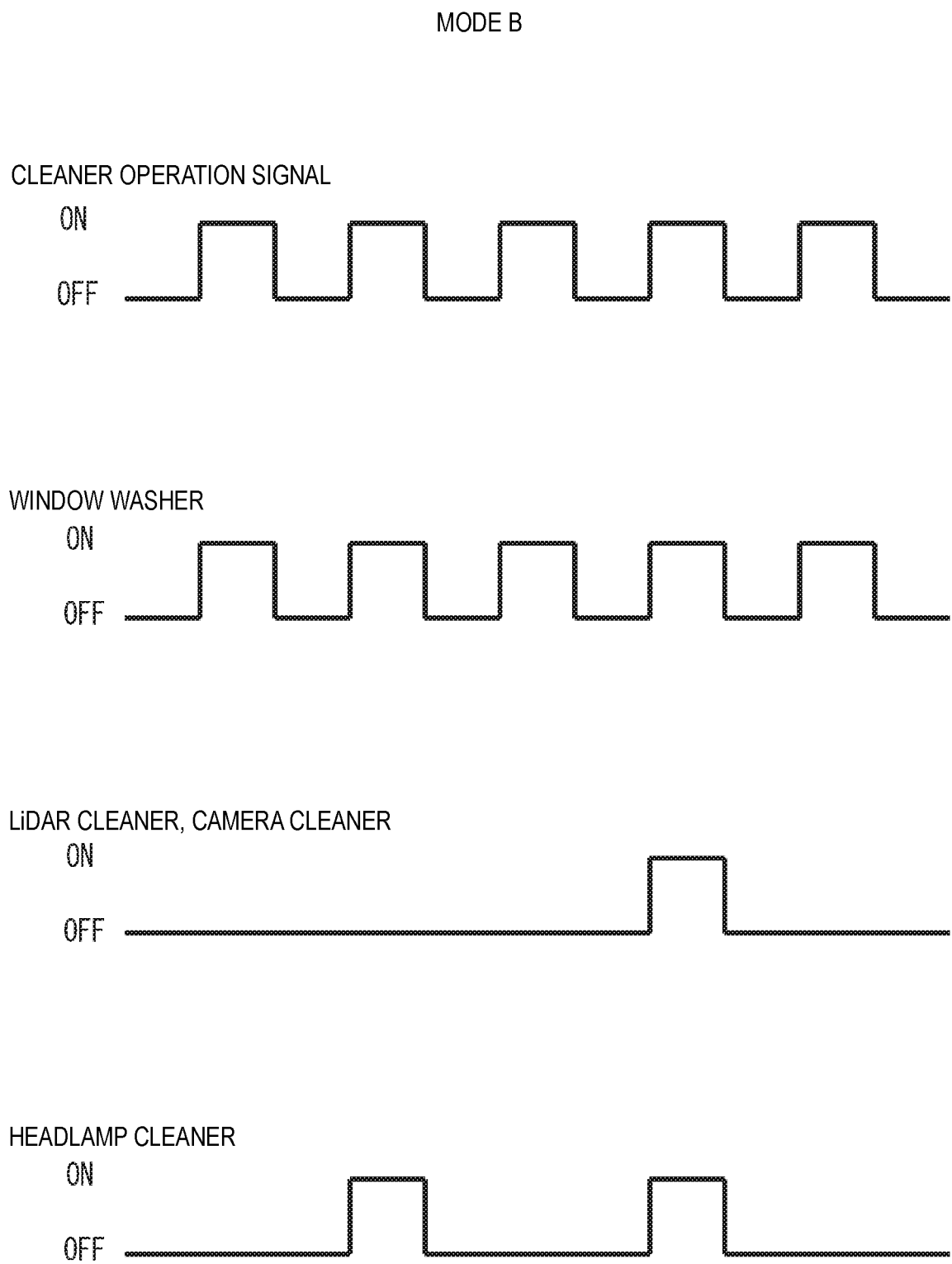
FIG. 6 is a timing chart of the mode B.

The mode B is a mode in which the front and rear windows 1f, 1b, the lamp 7, and the external sensor 6 are preferentially cleaned in this order. FIG. 6 shows a timing chart when the cleaner control unit 116 executes the mode B.

As shown in FIGS. 4 and 6, the WWs 101, 102 that clean the front and rear windows 1f, 1b are operated four times when a cleaner operation signal is input four times. The WWs 101, 102 are operated each time the cleaner operation signal is input to the cleaner control unit 116.

The LCs 103 to 106 and the camera cleaner 109 that clean the external sensor 6 are operated once when the cleaner operation signal is input four times. The LCs 103 to 106 and the camera cleaner 109 are not operated even when first to third cleaner operation signals are input, and are operated when a fourth cleaner operation signal is input.

The HCs 107, 108 that clean the lamp 7 are operated twice when the cleaner operation signal is input four times. The HCs 107, 108 are not operated even when the first and third cleaner operation signals are input, and are operated when the second and fourth cleaner operation signals are input.

According to the mode B, the front window 1f is preferentially cleaned, and the vision field of the occupant is easily kept well at all times. Therefore, the mode B is suitable when the occupant drives the vehicle 1.

According to the mode B, the priority of cleaning the lamp 7 is lower than that of the front window 1f and higher than that of the external sensor 6. Therefore, the mode B is suitable for daytime use in which the lamp 7 is not actively used.

According to the mode B, the priority of cleaning the external sensor 6 is the lowest. Therefore, the mode B is suitable when the vehicle control unit 3 is executing a driving mode in which the external sensor 6 is not actively used.

As described above, the mode B is suitable when the vehicle 1 travels in daytime and the vehicle control unit 3 is executing the manual driving mode.

(Mode C)

Figure 7:
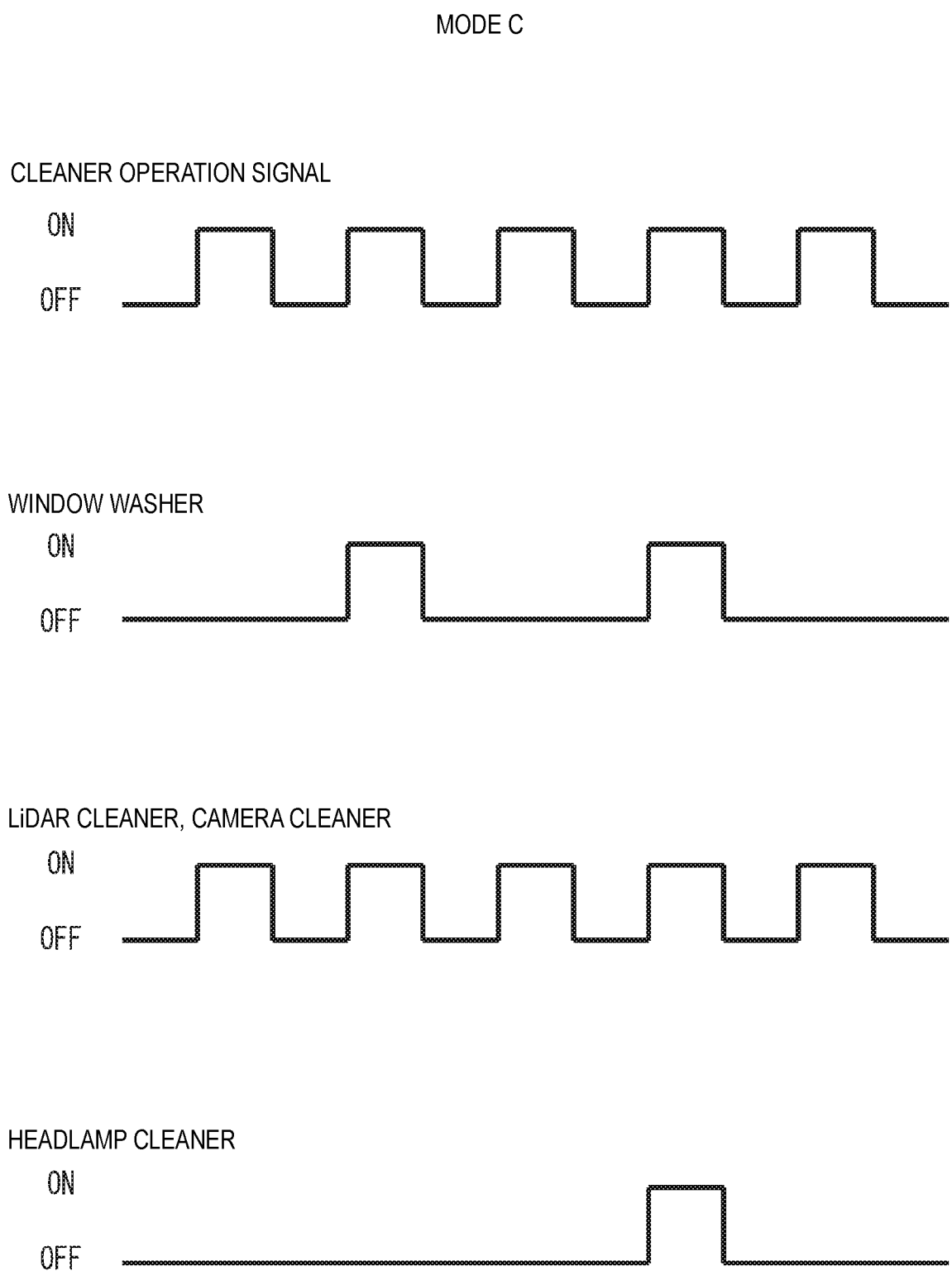
FIG. 7 is a timing chart of the mode C.

The mode C is a mode in which the external sensor 6, the front and rear windows 1f, 1b, and the lamp 7 are preferentially cleaned in this order. FIG. 7 shows a timing chart when the cleaner control unit 116 executes the mode C.

As shown in FIGS. 4 and 7, the WWs 101, 102 that clean the front and rear windows 1f, 1b are operated twice when a cleaner operation signal is input four times. The WWs 101, 102 are not operated even when first and third cleaner operation signals are input, and are operated when second and fourth cleaner operation signals are input.

The LCs 103 to 106 and the camera cleaner 109 that clean the external sensor 6 are operated four times when the cleaner operation signal is input four times. The LCs 103 to 106 and the camera cleaner 109 are operated each time the cleaner operation signal is input to the cleaner control unit 116.

The HCs 107, 108 that clean the lamp 7 are operated once when the cleaner operation signal is input four times. The HCs 107, 108 are not operated even when the first to third cleaner operation signals are input, and are operated when the fourth cleaner operation signal is input.

According to the mode C, the external sensor 6 is preferentially cleaned, and sensitivity of the external sensor 6 is easily kept well at all times. Therefore, the mode C is suitable when the vehicle control unit 3 is executing a driving mode using the external sensor 6.

According to the mode C, the priority of the cleaning the front window 1f is lower than that of the external sensor 6 but higher than that of the lamp 7. Therefore, the vision field of the occupant is easily kept well in the mode C.

According to the mode C, the priority of cleaning the lamp 7 is the lowest. Therefore, the mode C is suitable for daytime use in which the lamp 7 is not actively used.

As described above, the mode C is suitable when the vehicle 1 travels in daytime and the vehicle control unit 3 is executing the fully automatic driving mode, the advanced driving assistance mode, or the driving assistance mode.

(Mode D)

Figure 8:
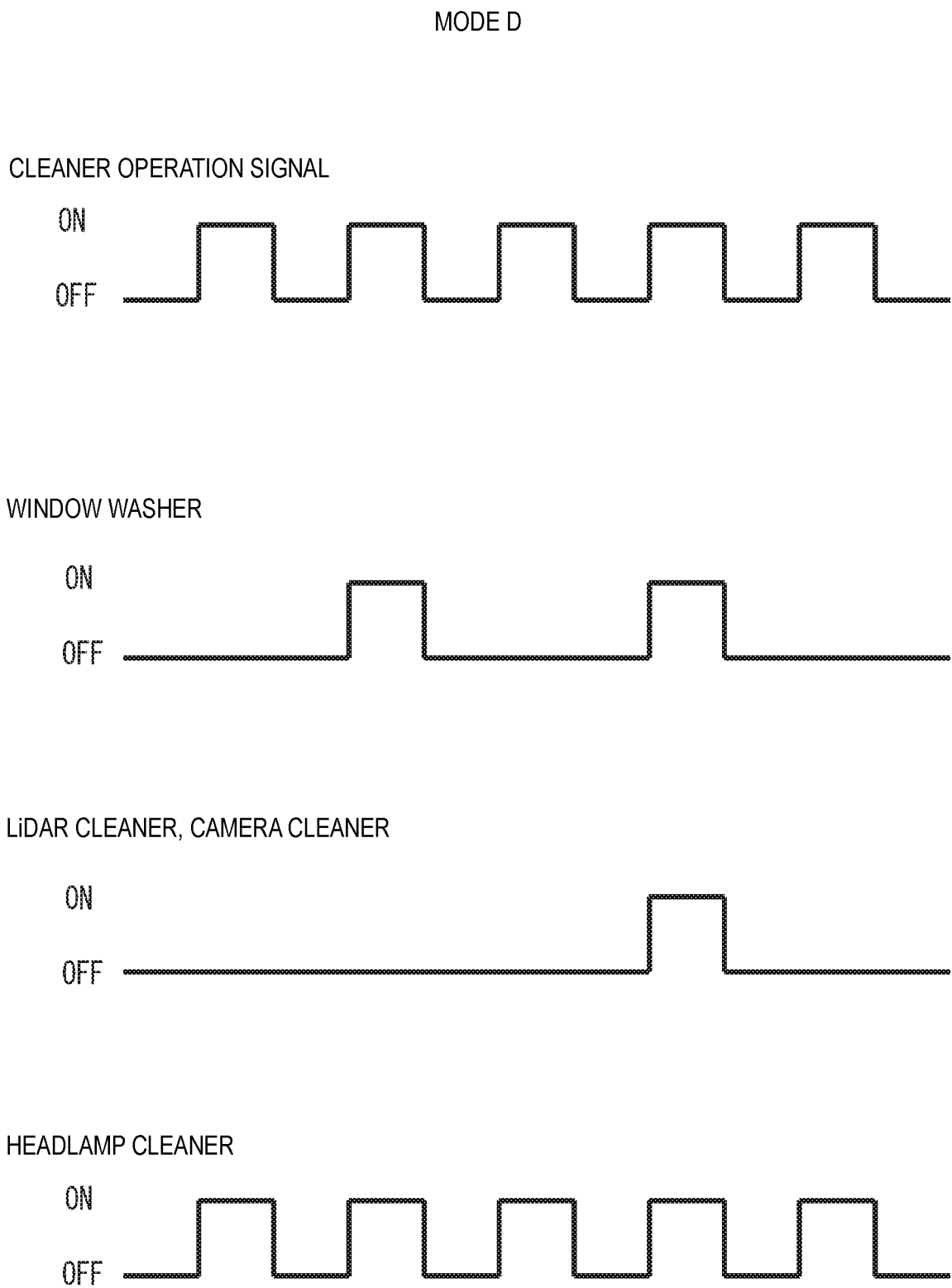
FIG. 8 is a timing chart of the mode D.

The mode D is a mode in which the lamp 7, the front and rear windows 1f, 1b, and the external sensor 6 are preferentially cleaned in this order. FIG. 8 shows a timing chart when the cleaner control unit 116 executes the mode D.

As shown in FIGS. 4 and 8, the WWs 101, 102 that clean the front and rear windows 1f, 1b are operated twice when a cleaner operation signal is input four times. The WWs 101, 102 are not operated even when first and third cleaner operation signals are input, and are operated when second and fourth cleaner operation signals are input.

The LCs 103 to 106 and the camera cleaner 109 that clean the external sensor 6 are operated once when the cleaner operation signal is input four times. The LCs 103 to 106 and the camera cleaner 109 are not operated even when the first to third cleaner operation signals are input, and are operated when the fourth cleaner operation signal is input.

The HCs 107, 108 that clean the lamp 7 are operated four times when the cleaner operation signal is input four times. The HCs 107, 108 are operated each time the cleaner operation signal is input to the cleaner control unit 116.

According to the mode D, the lamp 7 is preferentially cleaned, the vision field of the user at night is easily kept well, and the own vehicle is easily recognized by others at night. Therefore, the mode D is suitable for nighttime use.

According to the mode D, the priority of cleaning the front window 1f is lower than that of the lamp 7 but higher than that of the external sensor 6. Therefore, the mode D is suitable at night when the vehicle control unit 3 is executing the manual driving mode.

According to the mode D, the priority of cleaning the external sensor 6 is the lowest. Therefore, the mode D is suitable for manual driving in which the external sensor 6 is not actively used.

As described above, the mode D is suitable when the vehicle 1 travels at night and the vehicle control unit 3 is executing the manual driving mode.

(Mode E)

Figure 9:
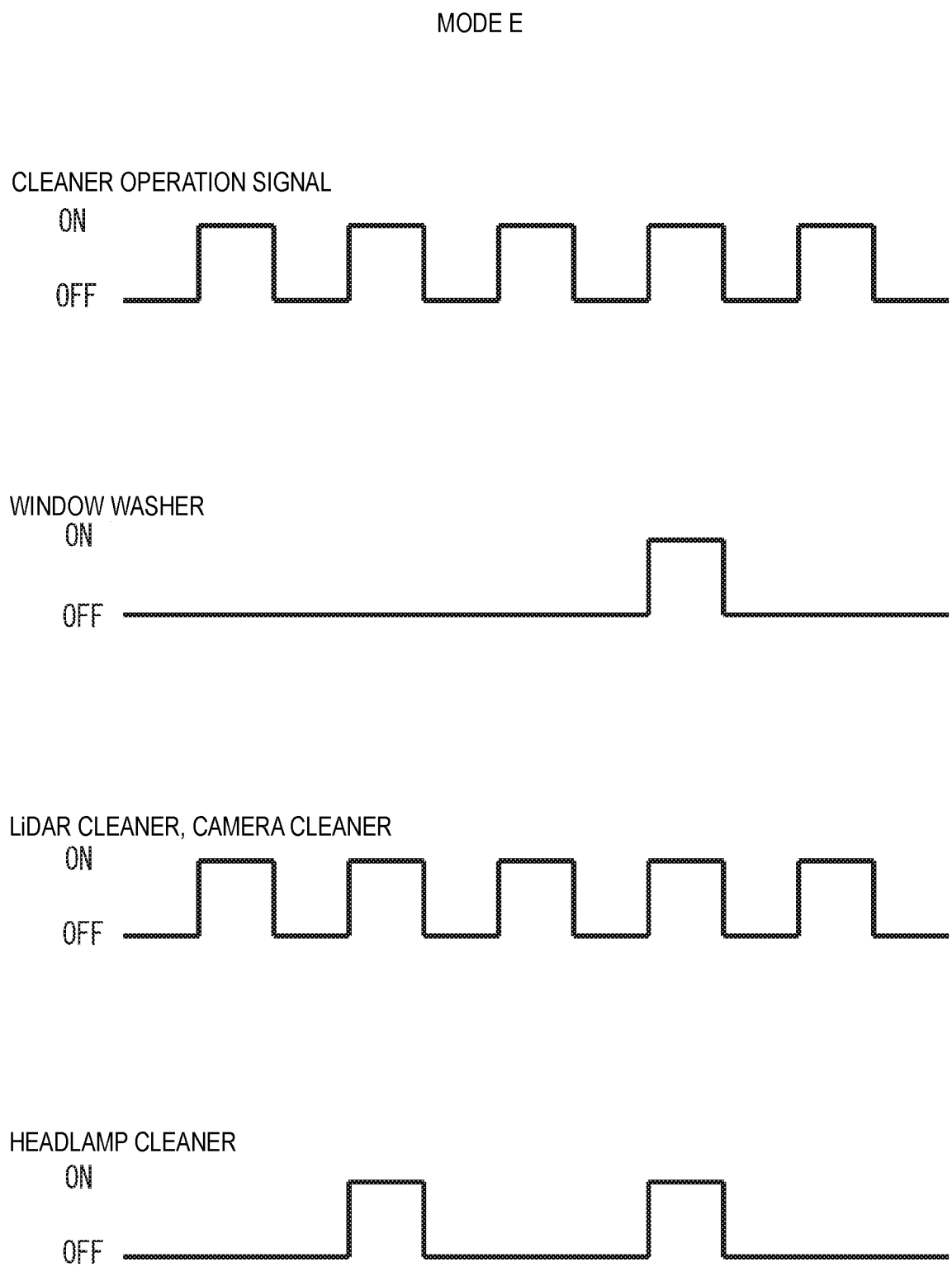
FIG. 9 is a timing chart of the mode E.

The mode E is a mode in which the external sensor 6, the lamp 7, and the front and rear windows 1f, 1b are preferentially cleaned in this order. FIG. 9 shows a timing chart when the cleaner control unit 116 executes the mode E.

As shown in FIGS. 4 and 9, the WWs 101, 102 that clean the front and rear windows 1f, 1b are operated once when a cleaner operation signal is input four times. The WWs 101, 102 are not operated even when first to third cleaner operation signals are input, and are operated when a fourth cleaner operation signal is input.

The LCs 103 to 106 and the camera cleaner 109 that clean the external sensor 6 are operated four times when the cleaner operation signal is input four times. The LCs 103 to 106 and the camera cleaner 109 are operated each time the cleaner operation signal is input to the cleaner control unit 116.

The HCs 107, 108 that clean the lamp 7 are operated twice when the cleaner operation signal is input four times. The HCs 107, 108 are not operated even when the first and third cleaner operation signals are input, and are operated when the second and fourth cleaner operation signals are input.

According to the mode E, the external sensor 6 is preferentially cleaned, and the sensitivity of the external sensor 6 is easily kept well at all times. Therefore, the mode E is suitable when the vehicle control unit 3 is executing a driving mode using output of the external sensor 6.

According to the mode E, the priority of cleaning the lamp 7 is lower than that of the external sensor 6 but higher than that of the front window 1f. Therefore, the mode E is suitable for nighttime use.

According to the mode E, the priority of cleaning the front window 1f is the lowest. Therefore, the mode E is suitable when the user does not actively view the front window 1f and the vehicle control unit 3 is not executing the manual driving mode.

As described above, the mode E is suitable when the vehicle 1 travels at night and the vehicle control unit 3 is executing the fully automatic driving or the advanced automatic driving mode.

(Mode F)

The mode F is a mode in which the lamp 7, the external sensor 6, and the front and rear windows 1f, 1b are preferentially cleaned in this order. FIG. 10 shows a timing chart when the cleaner control unit 116 executes the mode F.

As shown in FIGS. 4 and 10, the WWs 101, 102 that clean the front and rear windows 1f, 1b are operated once when a cleaner operation signal is input four times. The WWs 101, 102 are not operated even when first to third cleaner operation signals are input, and are operated when a fourth cleaner operation signal is input.

The LCs 103 to 106 and the camera cleaner 109 that clean the external sensor 6 are operated twice when the cleaner operation signal is input four times. The LCs 103 to 106 and the camera cleaner 109 are not operated even when the first and third cleaner operation signals are input, and are operated when the second and fourth cleaner operation signals are input.

The HCs 107, 108 that clean the lamp 7 are operated four times when the cleaner operation signal is input four times. The HCs 107, 108 are operated each time the cleaner operation signal is input to the cleaner control unit 116.

According to the mode F, the lamp 7 is preferentially cleaned, and the sensitivity of the camera 6c of the external sensor 6 at night is easily kept well, and the own vehicle is easily recognized by others at night. Therefore, the mode F is particularly suitable for nighttime use using the camera 6c.

According to the mode F, the priority of cleaning the external sensor 6 is lower than that of the lamp 7 but higher than that of the front window 1f. Therefore, the mode F is suitable when the vehicle control unit 3 is executing a mode other than the manual driving mode at night. In addition, the mode F is suitable when the vehicle 1 travels in an area where the external sensor 6 is hard to get dirty (for example, in an urban area instead of wilderness)

According to the mode F, the priority of cleaning the front window 1f is the lowest. Therefore, the mode F is suitable when the user does not actively view the front window 1f.

As described above, the mode F is suitable when the vehicle 1 is executing the fully automatic driving mode or the advanced driving assistance mode at night.

In the mode F, the priority of cleaning the lamp 7 is higher than that of the mode E, and the priority of cleaning the external sensor 6 is low. Therefore, compared with the mode E, the mode F is more suitable when the vehicle control unit 3 is executing the full automatic driving mode or the advanced driving assistance mode based on information output from the camera 6c.

(Mode G)

The mode G is a mode in which the front and rear windows 1f, 1b and the external sensor 6, and the lamp 7 are preferentially cleaned in this order. The front and rear windows 1f, 1b and the external sensor 6 have the same priority. FIG. 11 shows a timing chart when the cleaner control unit 116 executes the mode G.

As shown in FIGS. 4 and 11, the WWs 101, 102 that clean the front and rear windows 1f, 1b are operated four times when a cleaner operation signal is input four times. The WWs 101, 102 are operated each time the cleaner operation signal is input to the cleaner control unit 116.

The LCs 103 to 106 and the camera cleaner 109 that clean the external sensor 6 are operated four times when the cleaner operation signal is input four times. The LCs 103 to 106 and the camera cleaner 109 are operated each time the cleaner operation signal is input to the cleaner control unit 116.

The HCs 107, 108 that clean the lamp 7 are operated twice when the cleaner operation signal is input four times. The HCs 107, 108 are not operated even when first and third cleaner operation signals are input, and are operated when second and fourth cleaner operation signals are input.

According to the mode G, the front window 1f and the external sensor 6 are preferentially cleaned, and the vision field of the occupant and the sensitivity of the external sensor 6 are easily kept well at all times.

According to the mode G, the priority of cleaning the lamp 7 is the lowest. Therefore, the mode G is suitable for daytime use in which the lamp 7 is not actively used.

As described above, the mode G is suitable when the vehicle 1 travels in daytime and the vehicle control unit 3 is executing the fully automatic driving mode, the advanced driving assistance mode, the driving assistance mode, or the manual driving mode.

Compared with the mode C, the front window 1f is more easily kept clean and the vision field of the occupant is more easily kept well, so that the mode G is suitable for the driving assistance mode or when the occupant enjoys a view outside the vehicle. However, consumption of the cleaning medium in the mode G is larger than that in the mode C.

(Mode H)

The mode H is a mode in which the front and rear windows 1f, 1b and the lamp 7, and the external sensor 6 are preferentially cleaned in this order. The front and rear windows 1f, 1b and the lamp 7 have the same priority. FIG. 12 shows a timing chart when the cleaner control unit 116 executes the mode H.

As shown in FIGS. 4 and 12, the WWs 101, 102 that clean the front and rear windows 1f, 1b are operated four times when a cleaner operation signal is input four times. The WWs 101, 102 are operated each time the cleaner operation signal is input to the cleaner control unit 116.

The LCs 103 to 106 and the camera cleaner 109 that clean the external sensor 6 are operated twice when the cleaner operation signal is input four times. The LCs 103 to 106 and the camera cleaner 109 are not operated even when first and third cleaner operation signals are input, and are operated when second and fourth cleaner operation signals are input.

The HCs 107, 108 that clean the lamp 7 are operated four times when the cleaner operation signal is input four times. The HCs 107, 108 are operated each time the cleaner operation signal is input to the cleaner control unit 116.

According to the mode H, the front window 1f and the lamp 7 are preferentially cleaned, the vision field of the user at night is easily kept well, and the own vehicle is easily recognized by others at night. Therefore, the mode H is suitable for nighttime use.

According to the mode H, the priority of cleaning the external sensor 6 is the lowest. Therefore, the mode H is suitable when the vehicle control unit 3 is executing a mode in which the external sensor 6 is not actively used.

As described above, the mode H is suitable when the vehicle 1 travels at night and the vehicle control unit 3 is executing the manual driving mode.

The mode H is suitable when the vehicle 1 travels at night and the vehicle control unit 3 is executing the manual driving mode since the front window 1f is easily kept clean. However, the consumption of the cleaning medium in the mode H is larger than that in the mode D.

(Mode I)

The mode I is a mode in which the external sensor 6 and the lamp 7, and the front and rear windows 1f, 1b are preferentially cleaned in this order. The external sensor 6 and the lamp 7 have the same priority. FIG. 13 shows a timing chart when the cleaner control unit 116 executes the mode I.

As shown in FIGS. 4 and 13, the WWs 101, 102 that clean the front and rear windows 1f, 1b are operated twice when a cleaner operation signal is input four times. The WWs 101, 102 are not operated even when first and third cleaner operation signals are input, and are operated when second and fourth cleaner operation signals are input.

The LCs 103 to 106 and the camera cleaner 109 that clean the external sensor 6 are operated four times when the cleaner operation signal is input four times. The LCs 103 to 106 and the camera cleaner 109 are operated each time the cleaner operation signal is input to the cleaner control unit 116.

The HCs 107, 108 that clean the lamp 7 are operated four times when the cleaner operation signal is input four times. The HCs 107, 108 are operated each time the cleaner operation signal is input to the cleaner control unit 116.

According to the mode I, the external sensor 6 and the lamp 7 are preferentially cleaned, and the sensitivity of the external sensor 6 at night, particularly the camera 6c, is easily kept well. Therefore, the mode I is suitable at night when the vehicle control unit 3 is executing a driving mode in which the external sensor 6 is actively used.

According to the mode I, the priority of cleaning the front window 1f is the lowest. Therefore, the mode I is suitable when the user does not actively drive the vehicle 1.

As described above, the mode I is suitable when the vehicle 1 travels at night and the vehicle control unit 3 is executing the fully automatic driving mode or the advanced driving assistance mode.

Both the external sensor 6 and the lamp 7 are more easily kept clean in the mode I than in the mode E, F. Therefore, compared with the mode E, F, the mode I is more suitable when the vehicle 1 travels at night and the vehicle control unit 3 is executing the fully automated driving mode or the advanced driving assistance mode. However, the consumption of the cleaning medium in the mode I is larger than that in the mode E, F.

(Modes 1 to 11)

The cleaner system 100 is configured to be able to combine the modes A to I shown in FIG. 4 and modes 1 to 11 shown in FIG. 14.

The modes 1 to 11 define the number of operations of the LCs 103 to 106 and the camera cleaner 109 with respect to the number inputs of the cleaner operation signals when the object to be cleaned is limited to the external sensor 6. For example, a mode I5 combined by the mode I and the mode 5 may be set in the cleaner control unit 116. The mode I5 is a mode as shown in FIG. 15.

When the cleaner control unit 116 executes the mode 15, the cleaner system 100 operates as follows as shown in FIG. 15.

The WWs 101, 102 that clean the front and rear windows 1f, 1b are operated four times when a cleaner operation signal is input eight times. The WWs 101, 102 are not operated even when first, third, fifth and seventh cleaner operation signals are input, and are operated when second, fourth, sixth and eighth cleaner operation signals are input.

The front LC 103 and the camera cleaner 109 that clean the front LiDAR 6f and the camera 6c are operated eight times when the cleaner operation signal is input eight times. The front LC 103 and the camera cleaner 109 are operated each time the cleaner operation signal is input to the cleaner control unit 116.

The rear LC 104 that cleans the rear LiDAR 6b is operated twice when the cleaner operation signal is input eight times. The rear LC 104 is not operated even when the first to third, and the fifth to seventh cleaner operation signals are input, and is operated when the fourth and eighth cleaner operation signals are input.

The left and right LCs 105, 106 that clean the left and right LiDARs 6r, 6l are operated four times when the cleaner operation signal is input eight times. The left and right LCs 105, 106 are not operated even when the first, third, fifth and seventh cleaner operation signals are input, and are operated when the second, fourth, sixth and eighth cleaner operation signals are input.

The HCs 107, 108 that clean the lamp 7 are operated eight times when the cleaner operation signal is input eight times. The HCs 107, 108 are operated each time the cleaner operation signal is input to the cleaner control unit 116.

The mode I5 is suitable when the vehicle 1 travels at night and the vehicle control unit 3 is executing the fully automatic driving mode or the advanced driving assistance mode. In the mode I5, the priority of cleaning the front LiDAR 6f and the camera 6c that acquire information on the front side of the vehicle 1 is high. Compared with this, the priority of cleaning the rear LiDAR 6b and the left and right LiDARs 6r and 6l is low. Therefore, the mode 15 is suitable when the vehicle 1 travels on, for example, a highway with a low frequency of turning right, left or backward. Since frequency of cleaning the rear LiDAR 6b and the left and right LiDAR 6r and 6l is reduced, the cleaning medium can be saved. As described above, the mode I5 is suitable when the vehicle 1 travels on the highway at night and the vehicle control unit 3 is executing the fully automatic driving mode or the advanced driving assistance mode.

In this way, the cleaner system 100 is configured to be able to select which sensor is preferentially cleaned in the external sensor 6. Thereby, a cleaning state can be obtained, which is more suitable for a situation where the vehicle 1 is placed while saving the cleaning medium.

As described above, in the modes A to F, the cleaner control unit 116 operates the window washer, the lamp cleaner, and the sensor cleaner such that at least two or more of the number of operations of the WWs 101, 102, the number of operations of the HCs 107, 108, and the number of operations of the sensor cleaners 103 to 106, 109 are different in accordance with a predetermined number of cleaner operation signals. When the modes G to I are combined with the modes 2 to 11, the cleaners 101 to 109 are operated such that at least two or more of the various cleaners 101 to 109 are different.

According to the cleaner system 100 of the present embodiment, at least two or more of the number of operations of the WWs 101, 102, the number of operations of the HCs 107, 108, and the number of operations of the sensor cleaners 103 to 106, 109 are different in accordance with the number of cleaner operation signals. Therefore, the object to be cleaned required by the scene is easily kept clean while saving the cleaning medium.

For example, when the vehicle control unit 3 is executing the automatic driving mode, the modes C, E to G, I having a number of operations of the sensor cleaners 103 to 106, 109 larger than that of the WWs 101, 102 are selected. Thereby, the sensitivity of the external sensor 6 can be kept while saving the cleaning medium, as compared with a case where the WWs 101, 102, the HCs 107, 108, and the sensor cleaners 103 to 106, 109 are operated by the same number of operations.

Alternatively, when surroundings of the vehicle are bright, the number of operations of the WWs 101, 102 and the sensor cleaners 103 to 106, 109 is set to be larger than the number of operations of the HCs 107, 108. Thereby, the vision field of the user can be ensured by keeping the front window 1f clean while saving the cleaning medium, and the sensitivity of the external sensor 6 can be kept, as compared with the case where the WWs 101, 102, the HCs 107, 108, and the sensor cleaners 103 to 106, 109 are operated by the same number of operations.

In this way, since various cleaners can be operated so as to be suitable for the scene while saving the cleaning medium, the usability of the cleaner system 100 is improved.

In the above cleaner system 100, the cleaner control unit is configured to be able to change a magnitude relationship between the number of operations of the WWs 101, 102, the number of operations of the HCs 107, 108, and the number of operations of the sensor cleaners 103 to 106, 109 in accordance with the predetermined number of inputs of the cleaner operation signals.

Thereby, the optimal modes A to I, 1 to 11 can be selected corresponding to various scenes.

In the above cleaner system 100, the magnitude relationship between the number of operations of the WWs 101, 102, the number of operations of the HCs 107, 108, and the number of operations of the sensor cleaners 103 to 106, 109 in accordance with the predetermined number of inputs of the cleaner operation signals can be changed depending on the input of the user.

Thereby, since the modes A to I, 1 to 11 can be changed based on intention of the user, the cleaner system 100 can be operated in a mode suitable for the scene intended by the user.

In the above cleaner system 100, the magnitude relationship between the number of operations of the WWs 101, 102, the number of operations of the HCs 107, 108, and the number of operations of the sensor cleaners 103 to 106, 109 in accordance with to the predetermined number of inputs of the cleaner operation signals can be changed depending on an automatic driving state and a manual driving state of the vehicle 1.

Thereby, since the modes A to I, 1 to 11 of the cleaner system 100 are changed based on whether a state is the automatic driving state or the manual driving state, a mode can be selected in which cleanliness of the external sensor 6 required by the automatic driving is easily kept, or a mode can be selected in which cleanliness of the front window 1f and the lamp 7 required by the manual driving is easily kept.

In the above cleaner system 100, the magnitude relationship between the number of operations of the WWs 101, 102, the number of operations of the HCs 107, 108, and the number of operations of the sensor cleaners 103 to 106, 109 in accordance with the predetermined number of inputs of the cleaner operation signals can be changed depending on a signal indicating the automatic driving state and the manual driving state of the vehicle 1 output by the vehicle control unit 3 that automatically drives the vehicle 1.

Since the vehicle control unit 3 inputs the automatic driving state/the manual driving state to the cleaner system 100 and the user does not need to operate the cleaner system 100, a burden on the user is reduced.

The cleaner system 100 is configured such that various modes can be changed by an operation of the user on the mode switching switch 117 (see FIG. 3) provided in the vehicle interior. The vehicle control unit 3 is configured to output a mode switching signal according to an output of the internal sensor 5, an output of the external sensor 6, and a driving mode being executed. For example, the vehicle control unit 3 outputs a mode switching signal according to at least one of time, ambient brightness, vehicle speed, acceleration, and navigation information. The cleaner system 100 is configured to be able to change the various modes A to I, 1 to 11 according to the mode switching signal output from the vehicle control unit 3.

In this way, in the above cleaner system 100, the magnitude relationship between the number of operations of the WWs 101, 102, the number of operations of the HCs 107, 108, and the number of operations of the sensor cleaners 103 to 106, 109 in accordance with the predetermined number of inputs of the cleaner operation signals can be changed according to at least one of time, ambient brightness, vehicle speed, acceleration, and navigation information.

Thereby, even if the user does not select, an optimal mode corresponding to the specific scene is selected, so that the burden on the user is reduced. The navigation information includes map information, travel route information, right and left turning information, travel lane information, and the like, and is for moving the vehicle to a destination.

The above cleaner system 100 includes a plurality of sensor cleaners 103 to 106, 109 that respectively clean a plurality of external sensors having different detection methods. The cleaner control unit operates the sensor cleaners 103 to 106, 109 such that at least two or more of the numbers of the plurality of operations are different in accordance with the predetermined number of signals.

For example, the external sensor 6, such as the LiDARs 6f, 6r, 6b, 6l and the camera 6c, which have different detection methods, often require different scenes. For example, when fog is dark, information output from the front LiDAR 6f is more important than that from the camera 6c. Accordingly, by selecting the modes 1 to 11 such that the number of operations of the sensor cleaners 103 to 106, 109 is different in accordance with the predetermined number of the cleaner operation signals for each type of sensor, cleanliness of a specific external sensor 6 can be easily kept well according to a specific scene.

The above cleaner system 100 includes a plurality of sensor cleaners 103 to 106 that respectively clean a plurality of external sensors 6f, 6b, 6r, 6l provided at different positions.

The cleaner control unit 116 operates the sensor cleaners 103 to 106 such that at least two or more of the numbers of operations of the plurality of sensor cleaners 103 to 106 are different in accordance with the predetermined number of cleaner operation signals.

The plurality of external sensors 6 provided at different positions often require different scenes. For example, information output from the front LiDAR 6f is important when the vehicle 1 moves forward, information output from the rear LiDAR 6b is important when the vehicle 1 moves backward, information output from the right LiDAR 6r is important when the vehicle 1 turns right, and information output from the left LiDAR 6l is important when the vehicle 1 turns left. Accordingly, by selecting the modes 1 to 11 such that the number of operations of the sensor cleaners 103 to 106, 109 is different in accordance with the predetermined number of signals for each arrangement position of the external sensor 6, the cleanliness of the external sensor 6 required in a specific scene can be easily kept.

<Operation of Cleaner System According to Second Embodiment>

Next, an operation of the cleaner system 100 according to the second embodiment will be described.

Figure 16:
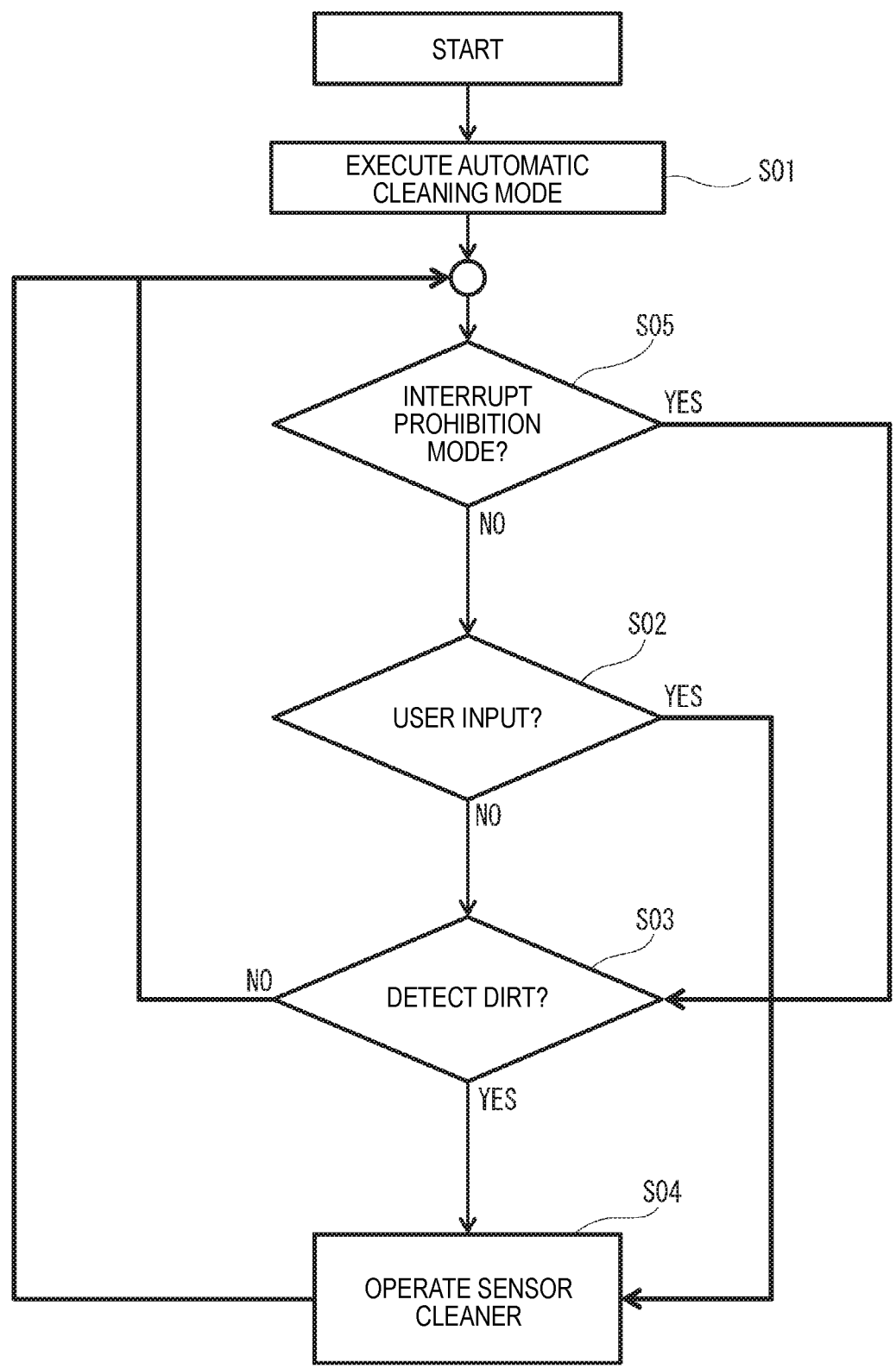
FIG. 16 is a flowchart of processing executed by a vehicle cleaner system according to the second embodiment.

FIG. 16 is a flowchart of processing executed by the cleaner system 100 according to the present embodiment. The processing shown in FIG. 16 is executed by the cleaner control unit 116 of the cleaner system 100. As shown in FIG. 16, the cleaner control unit 116 executes an automatic cleaning mode (step S01). The automatic cleaning mode is a mode in which the sensor cleaners 103 to 106, 109 are operated regardless of a signal output from the cleaner switch 115 (an example of an operation unit) that outputs a signal in accordance with an operation of a user.

As shown in FIG. 16, the cleaner control unit 116 executes a step of determining whether an interrupt prohibition mode is executed (step S05). If the interrupt prohibition mode is executed (step S05: Yes), the cleaner control unit 116 continues to execute the automatic cleaning mode without executing step S02, and determines whether there is a dirt signal (Step S03).

Next, if the interrupt prohibition mode is not executed (step S05: No), the cleaner control unit 116 confirms whether a signal output from the cleaner switch 115 is input at predetermined intervals (step S02). When the signal output from the cleaner switch 115 is not input (step S02: No), the cleaner control unit 116 determines whether the dirt signal is input (step S03).

In the present embodiment, the LiDARs 6f, 6b, 6r, 6l and the camera 6c are configured to be able to recognize that the sensitivity thereof has decreased. The LiDARs 6f, 6b, 6r, 6l and the camera 6c check the sensitivity thereof at predetermined intervals. The LiDARs 6f, 6b, 6r, 6l and the camera 6c determine that they are dirty when the sensitivity thereof falls below a predetermined threshold, and transmit a dirt signal to the cleaner control unit 116.

When the cleaner control unit 116 receives the dirt signal (step S03: Yes), the cleaner control unit 116 operates the sensor cleaners 103 to 106, 109 corresponding to the LiDARs 6f, 6b, 6r, 6l or camera 6c that have transmitted the dirt signal (step S04). The external sensors 6f, 6b, 6r, 6l, 6c do not have a function of determining that they are dirty, so that a dirt detection unit that determines that the external sensors 6f, 6b, 6r, 6l, 6c are dirty may be provided separately from the external sensors 6f, 6b, 6r, 6l, and 6c.

If the dirt signal is not input (step S03: No), the cleaner control unit 116 does not operate the sensor cleaners 103 to 106, 109, and the processing returns to the step of determining whether the interrupt prohibition mode is executed (step S05).

When the cleaner control unit 116 determines whether the signal output from the cleaner switch 115 is input at predetermined intervals, in a case where the signal output from the cleaner switch 115 is input (step S02: Yes), the cleaner control unit 116 operates at least one of the sensor cleaners 103 to 106, 109 (step S04). After the cleaner control unit 116 operates at least one of the sensor cleaners 103 to 106, 109, the processing returns to step S05.

In the vehicle 1 traveling in the automatic driving mode, since the sensitivity of the external sensor 6 is required to be kept well, operation frequency of the sensor cleaners 103 to 106, 109 is larger than that of the window washers 101, 102, and the like. Therefore, a burden on the user is increased when the user operates the sensor cleaners 101, 109 each time the external sensor 6 is dirty. However, according to the cleaner system 100 of the present embodiment, the burden on the user is reduced by the automatic cleaning mode. In addition, depending on a type of the external sensor 6, the user is unlikely to notice that the external sensor 6 is dirty. According to the cleaner system 100 of the present embodiment, in the automatic cleaning mode, the user is not required to pay attention to whether the external sensor 6 is dirty and the burden on the user is reduced.

On the other hand, even though the external sensor 6 can be kept clean in the automatic cleaning mode, the user may want to clean the external sensor 6 at a desired timing. Accordingly, according to the cleaner system 100 of the present embodiment, when the interrupt prohibition mode is not executed (step S05: No), the user can clean the external sensor 6 at a desired timing (step S02: Yes). In this way, in the cleaner system 100 of the present embodiment, both reduction in the burden on the user and cleaning at the desired timing by the user can be both achieved, thereby improving usability.

In the present embodiment, the cleaner control unit 116 is configured to continue to execute the automatic cleaning mode even after the signal from the cleaner switch 115 is input and the sensor cleaners 103 to 106, 109 are operated.

According to the present embodiment, since the automatic cleaning mode is kept even after the user operates the cleaner switch 115, the operation burden on the user is reduced.

The automatic cleaning mode may be ended after the user operates the cleaner switch 115, and thereafter, the sensor cleaners 103 to 106, 109 may be operated each time the user operates the cleaner switch 115. During execution of the automatic cleaning mode, the user is unlikely to grasp a consumption amount of a cleaning liquid. Therefore, when a remaining amount in the front tank 111 or the rear tank 113 is small, the automatic cleaning mode is preferably ended after the cleaner switch 115 is operated so that the user can easily grasp the consumption amount of the cleaning liquid.

In some cases, the user does not want to carelessly operate the sensor cleaners 103 to 106, 109. For example, when a remaining amount in the front tank 111 or the rear tank 113 is small, the cleaner system 100 is performing cleaning while saving the cleaning liquid in the automatic cleaning mode.

Accordingly, in the present embodiment, the cleaner control unit 116 can be set to the interrupt prohibition mode at any timing. For example, a button operated by the user or the vehicle control unit 3 may be configured to be able to transmit an electric signal for setting the cleaner control unit 116 to the interrupt prohibition mode. Alternatively, the cleaner control unit 116 may be configured to set itself to the interrupt prohibition mode based on some condition determination.

When the cleaner control unit 116 is configured to be able to execute the interrupt prohibition mode in this way, as shown in FIG. 16, before a step of determining whether the user has input the cleaner switch 115, the step of determining whether the interrupt prohibition mode is executed is executed (step S05). If the interrupt prohibition mode is being executed, the cleaner control unit 116 continues to execute the automatic cleaning mode without executing step S02, and determines whether there is a dirt signal (step S03).

In this way, the cleaner system 100 according to the present embodiment can set a mode in which the sensor cleaners 103 to 106, 109 do not operate even when the user operates the cleaner switch 115, and can flexibly cope with various situations.

Although the cleaner system 100 has been described as operating the sensor cleaners 103 to 106, 109 according to an output of the cleaner switch 115, the cleaner system 100 may be configured to operate the window washers 101, 102 together with the sensor cleaners 103 to 106, 109 according to the output of the cleaner switch 115. The front window 1f and the external sensor 6 are dirty to the same extent as time elapses. Accordingly, when the user tries to clean the front window 1f where dirt is easily found, it is reasonable to clean the external sensor 6 as well. The cleaners 103 to 106, 109 and the window washer 101, 102 may be configured to operate simultaneously, or may be configured to operate with a time difference.

Although a flow including the step of determining whether the interrupt prohibition mode is executed has been described in the above embodiment, the step of determining whether the interrupt prohibition mode is executed may be omitted, and the cleaner control unit 116 may be configured to operate the sensor cleaners 103 to 106, 109 whenever a signal output from the cleaner switch 115 is input.

Although an example in which the sensor cleaners 103 to 106, 109 are operated in accordance with an input of a dirt signal during the execution of the automatic cleaning mode has been described in the above embodiment, the present invention is not limited thereto. During the execution of the automatic cleaning mode, the sensor cleaners 103 to 106 may be operated at predetermined time intervals regardless of presence or absence of dirt, the sensor cleaners 103 to 106, 109 may be operated at predetermined travel distance intervals regardless of the presence or absence of dirt, and the sensor cleaners 103 to 106, 109 may be operated each time the engine is started regardless of the presence or absence of dirt. In this way, the cleaner control unit 116 may be configured to be able to switch various modes of how the automatic cleaning mode is executed. For example, when a signal output from the mode switching switch 117 (see FIG. 3) operable by the user is received, switching between various modes can be executed.

<Operation of Cleaner System According to Third Embodiment>

Next, an operation of the cleaner system 100 according to the third embodiment will be described.

Figure 17:
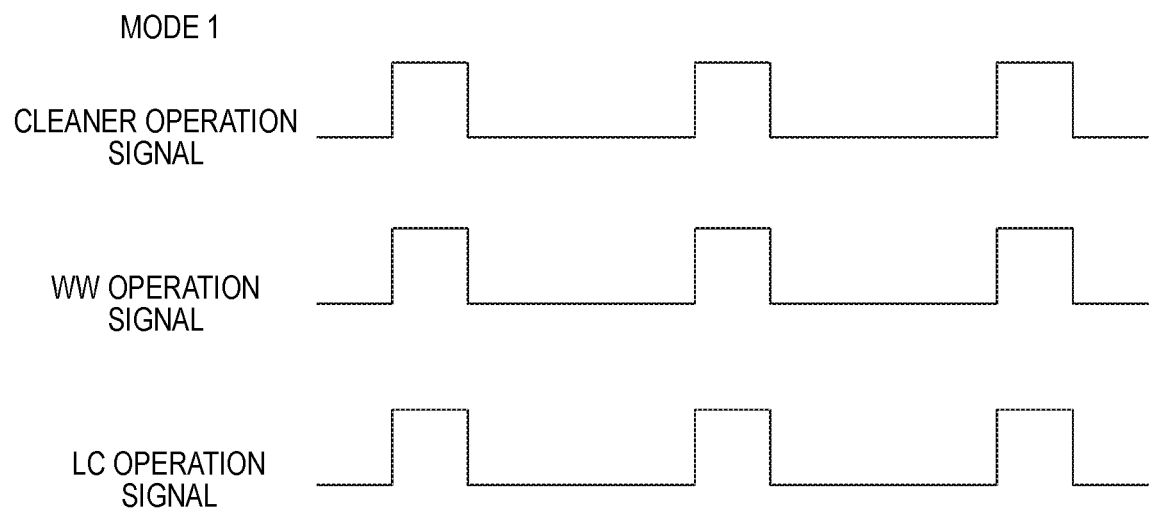
FIG. 17 is a timing chart of a mode 1 according to the third embodiment.

FIG. 17 shows a timing chart of the cleaner system 100. In FIG. 17, a cleaner operation signal, a WW operation signal, and an LC operation signal are shown from above to below. The LC operation signal is an electric signal transmitted by the cleaner control unit 116 to the sensor cleaners 103 to 106 to be operated when at least one of the sensor cleaners 103 to 106 that clean the LiDARs 6f, 6b, 6r, 6l are operated.

As shown in FIG. 17, each time the cleaner operation signal is input once, the cleaner control unit 116 outputs the WW operation signal to the front WW 101 once, and outputs the LC operation signal to the sensor cleaners 103 to 106 to be operated once. The WW operation signal and the LC operation signal are simultaneously output. In the following description, a mode for executing the timing chart shown in FIG. 17 is referred to as a "mode 1".

In this way, the cleaner system 100 according to the present embodiment includes the cleaner control unit 116 that operates the LCs 103 to 106 in accordance with an operation of the front WW 101.

The LC operation signal may be transmitted to all the LCs 103 to 106 to operate all the LCs 103 to 106, or may be transmitted only to the front LC 103 to operate only the front LC 103.

By the way, dirt on the LiDARs 6f, 6b, 6r, 6l cannot be directly seen by the user in a vehicle interior, and the user is unlikely to directly grasp a decrease in sensitivity due to the dirt on the LiDARs 6f, 6b. 6r, 6l. In addition, when a switch only to drive the sensor cleaners 103 to 106 that clean the LiDARs 6f, 6b, 6r, 6l is provided in the vehicle interior, an operation burden on the user increased.

Therefore, the present inventor has noticed that when the front window 1f is dirty, the LiDARs 6f, 6b, 6r, 6l are also likely to be dirty. For example, when dust adheres to the front window 1f, dust is also likely to adhere to the front LiDAR 6f, the rear LiDAR 6b, the right LiDAR 6r, and the left LiDAR 6l. Accordingly, if the LCs 103 to 106 are also operated when the user operates the front WW 101, the LiDARs 6f, 6b, 6r, 6l can be easily kept clean without increasing the burden on the user. Therefore, the cleaner system 100 according to the present embodiment operates the LCs103 to 106 in accordance with the operation of the front WW 101, which is user-friendly.

Similarly to the front window 1f, the rear window 1r is also likely to be noticed dirty by the user. Therefore, the LCs 103 to 106 may be configured to be operated in accordance with the operation of the rear WW 102. Alternatively, the LCs 103 to 106 may be configured to be operated in accordance with the operation of at least one of the front WW 101 and the rear WW 102.

Figure 18:
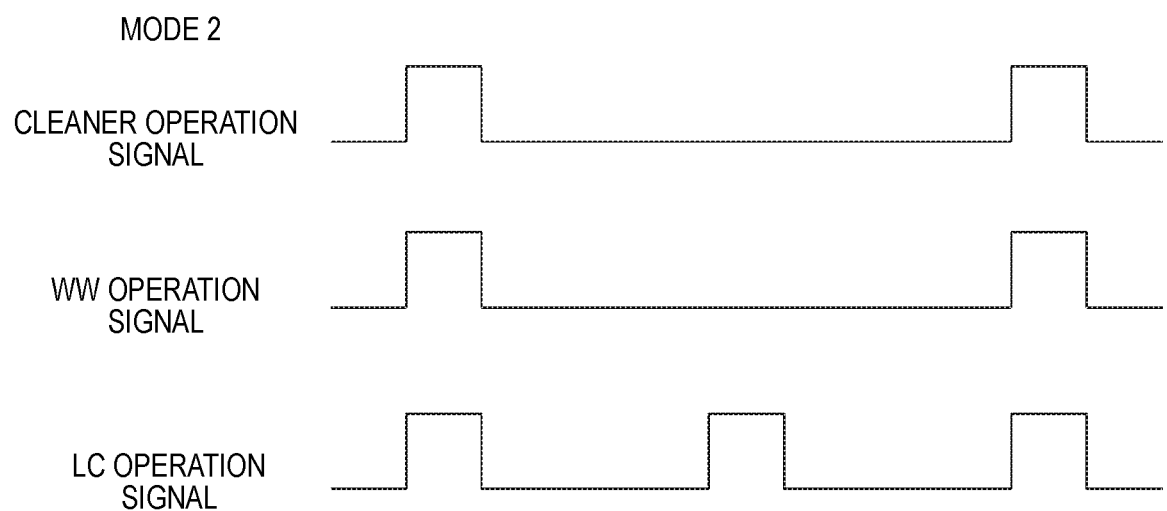
FIG. 18 is a timing chart of a mode 2.
Figure 19:
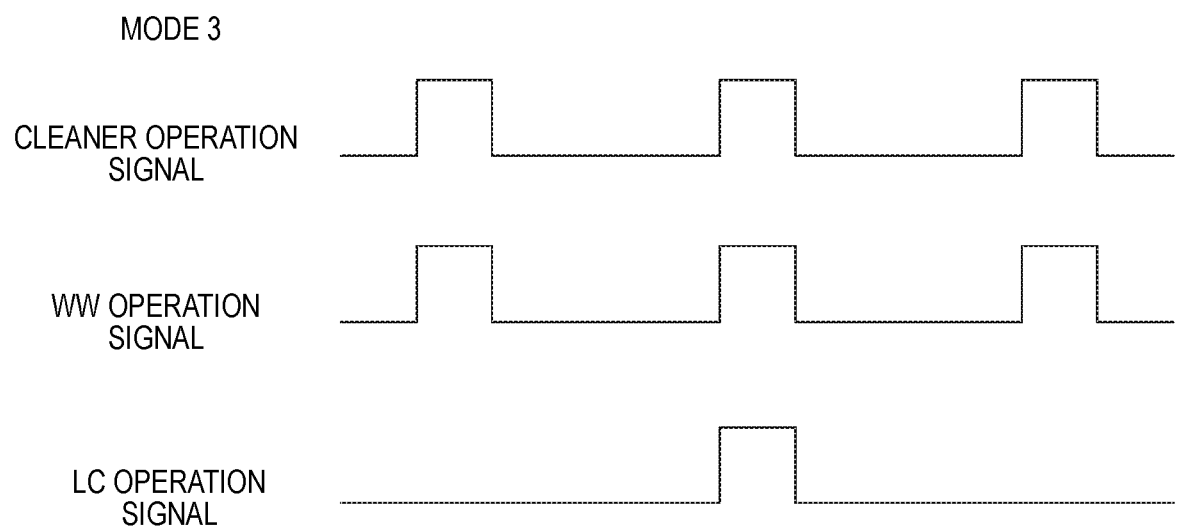
FIG. 19 is a timing chart of a mode 3.

The timing chart shown in FIG. 17 shows the mode 1 in which, each time the front WW101 is operated once, at least one of the LCs 103 to 106 is operated once simultaneously with the front WW 101. However, the cleaner system according to the present embodiment may be capable of executing a mode other than the mode 1. FIG. 18 is a timing chart of a mode 2 executed by the cleaner system 100 according to the present embodiment. FIG. 19 is a timing chart of a mode 3 executed by the cleaner system 100 according to the present embodiment.

As shown in FIG. 18, each time the WW operation signal is output once, the LC operation signal may be output twice. When the vehicle 1 travels in a fully automatic driving mode, the priority of keeping the LiDARs 6f, 6b, 6r, 6l clean is higher than that of keeping the front window 1f clean. The mode 2 is set such that the number of outputs of LC operation signals is larger than the number of outputs of WW operation signals, and is a mode suitable when the vehicle 1 travels in the fully automatic driving mode. In the mode 2, the LC operation signal may be output three times or more each time the WW operation signal is output once.

As shown in FIG. 18, each time the WW operation signal is output once, the LC operation signal may be output twice. When the vehicle 1 travels in a manual driving mode or a driving assistance mode, the priority of keeping the front window 1f clean is higher than that of keeping the LiDARs 6f, 6b, 6r, 6l clean. Accordingly, the mode 3 is set such that the number of outputs of the WW operation signals is larger than the number of outputs of the LC operation signals, and is a mode suitable when the vehicle 1 travels in the manual driving mode or the driving assistance mode. In the mode 3, the LC operation signal may be output once each time the WW operation signal is output three or more times.

The cleaner system 100 according to the present embodiment is configured such that the above modes 1 to 3 can be switched in accordance with an output of the mode switching switch 117 (see FIG. 3) provided in the vehicle interior. Alternatively, the vehicle control unit 3 may determine a driving mode and transmit a mode switching signal for switching the modes 1 to 3 according to a determination result to the cleaner control unit 116. Thereby, a cleaning mode suitable for a situation such as the driving mode can be executed, and the front window 1f, the rear window 1r, and the LiDARs 6f, 6b, 6r, 6l are easily kept clean when required.

Figure 20:
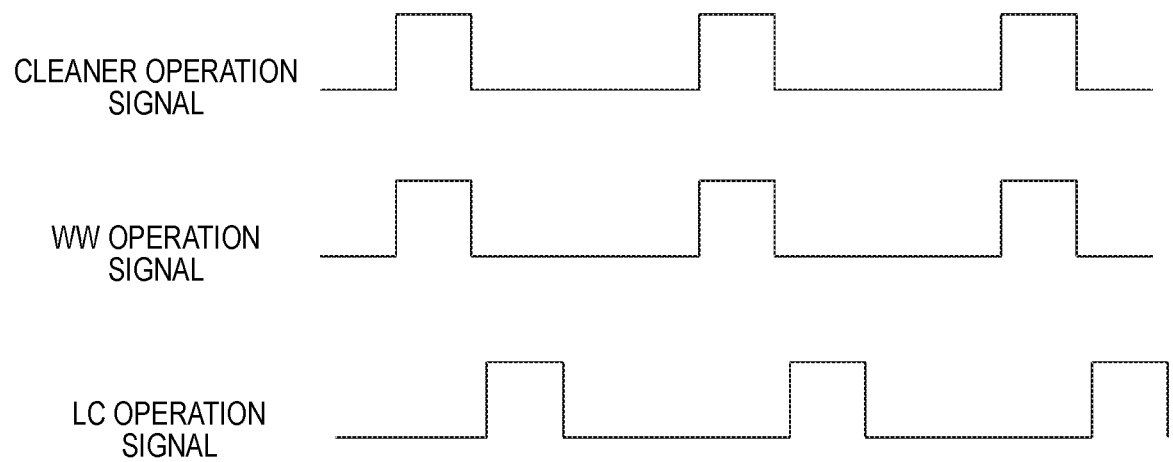
FIG. 20 is a timing chart of a modification of the mode 1.
Figure 21:
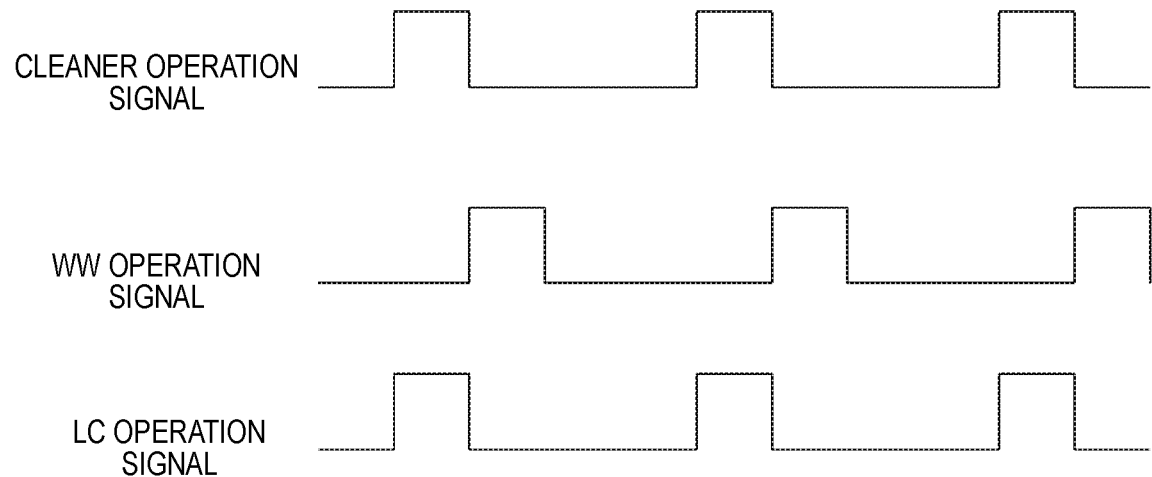
FIG. 21 is a timing chart of a modification of the mode 1.

Although an example in which a rise of the WW operation signal and a rise of the LC operation signal are simultaneously formed has been described in the above modes 1 to 3, the present invention is not limited thereto. FIGS. 20 and 21 show timing charts of a modification of the mode 1.

As shown in FIG. 20, a rise of the LC operation signal may be output after a rise of the WW operation signal. In addition, the rise of the LC operation signal may be output simultaneously with or after a fall of the WW operation signal.

Alternatively, as shown in FIG. 21, a rise of the WW operation signal may be output after a rise of the LC operation signal. In addition, the rise of the WW operation signal may be output simultaneously with or after a fall of the LC operation signal.

In particular, in a case where the front WW 101 and the LCs 103 to 106 are connected to common front tank 111 and front pump 112 as shown in FIG. 3, when the front WW 101 is operated, pressure of cleaning liquid in a pipe between the front pump 112 and the LCs 103 to 106 decreases. Therefore, when the LCs 103 to 106 are operated during an operation of the front WW 101, discharge pressure of the cleaning liquid discharged from the front WW 101 and the LCs 103 to 106 may decrease. Therefore, as shown in FIGS. 20 and 21, when an operation timing of the front WW 101 and an operation timing of the LCs 103 to 106 are different, the cleaning liquid is likely to be discharged at a high discharge pressure from the front WW 101 and the LCs 103 to 106.

Figure 22:
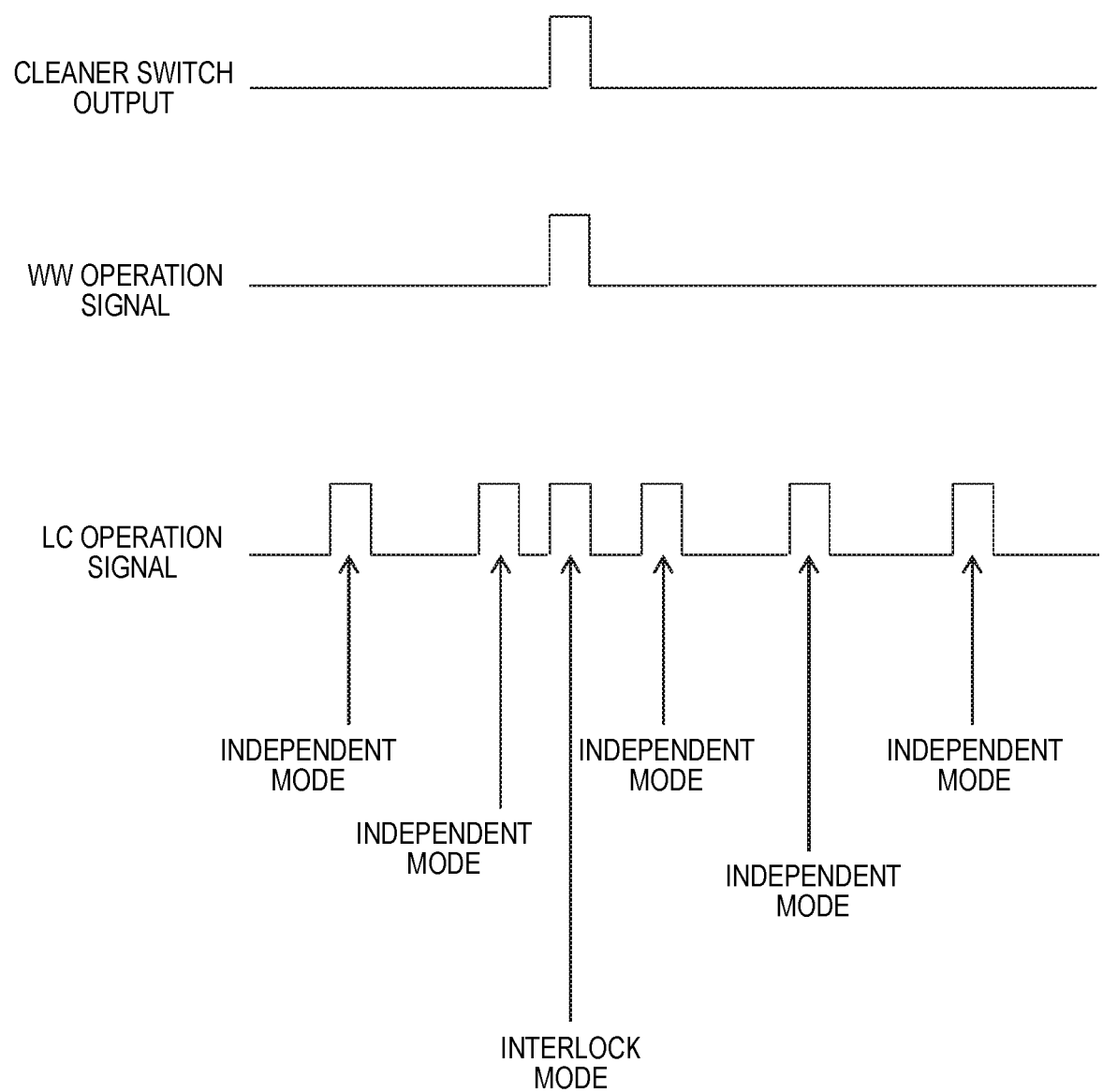
FIG. 22 is a timing chart of a cleaner system according to a modification of the present invention.

The cleaner control unit 116 may be configured to be able to execute a combination of an interlock mode in which the WW operation signal and the LC operation signal are output interlockingly, and an independent mode in which the WW operation signal and the LC operation signal are not interlocked. FIG. 22 is a timing chart of the cleaner system 100 according to a modification of the present invention.

In the present modification as shown in FIG. 22, the cleaner control unit 116 outputs a cleaner operation signal such that the LC operation signal is output every predetermined time. At this time, the LC operation signal output every predetermined time is not interlocked with the WW operation signal (the independent mode) and the WW operation signal is not output. However, when the cleaner operation signal output from the cleaner switch 115 (see FIG. 3) operated by the user is input to the cleaner control unit 116, the cleaner control unit 116 interlocks the WW operation signal and the LC operation signal, and simultaneously outputs the WW operation signal and the LC operation signal (the interlock mode).

According to such a configuration, since the LCs 103 to 106 are operated every predetermined time and when the user operates the cleaner switch 115, the LiDARs 6*f*, 6*b*, 6*r*, 6*l* are easily kept clean. On the other hand, since the front WW 101 is operated only when the user operates the cleaner switch 115, the user does not feel uncomfortable. In this way, the cleaner control unit 116 may be configured to selectively use the interlock mode and the independent mode depending on where the cleaner operation signal input to the cleaner control unit 116 is transmitted.

The independent mode may be configured to output a signal for operating a cleaner every predetermined time, and to output a signal for operating the cleaner each time the vehicle travels a predetermined distance.

Next, a vehicle cleaner system according to a fourth embodiment will be described.

Elements of a vehicle cleaner system 1100 (hereinafter, referred to as a cleaner system 1100) according to the fourth embodiment are denoted by reference numerals added to elements of the cleaner system 100 according to the first embodiment. Description of the elements of the fourth embodiment common to those of the first embodiment will be omitted.

Figure 23:
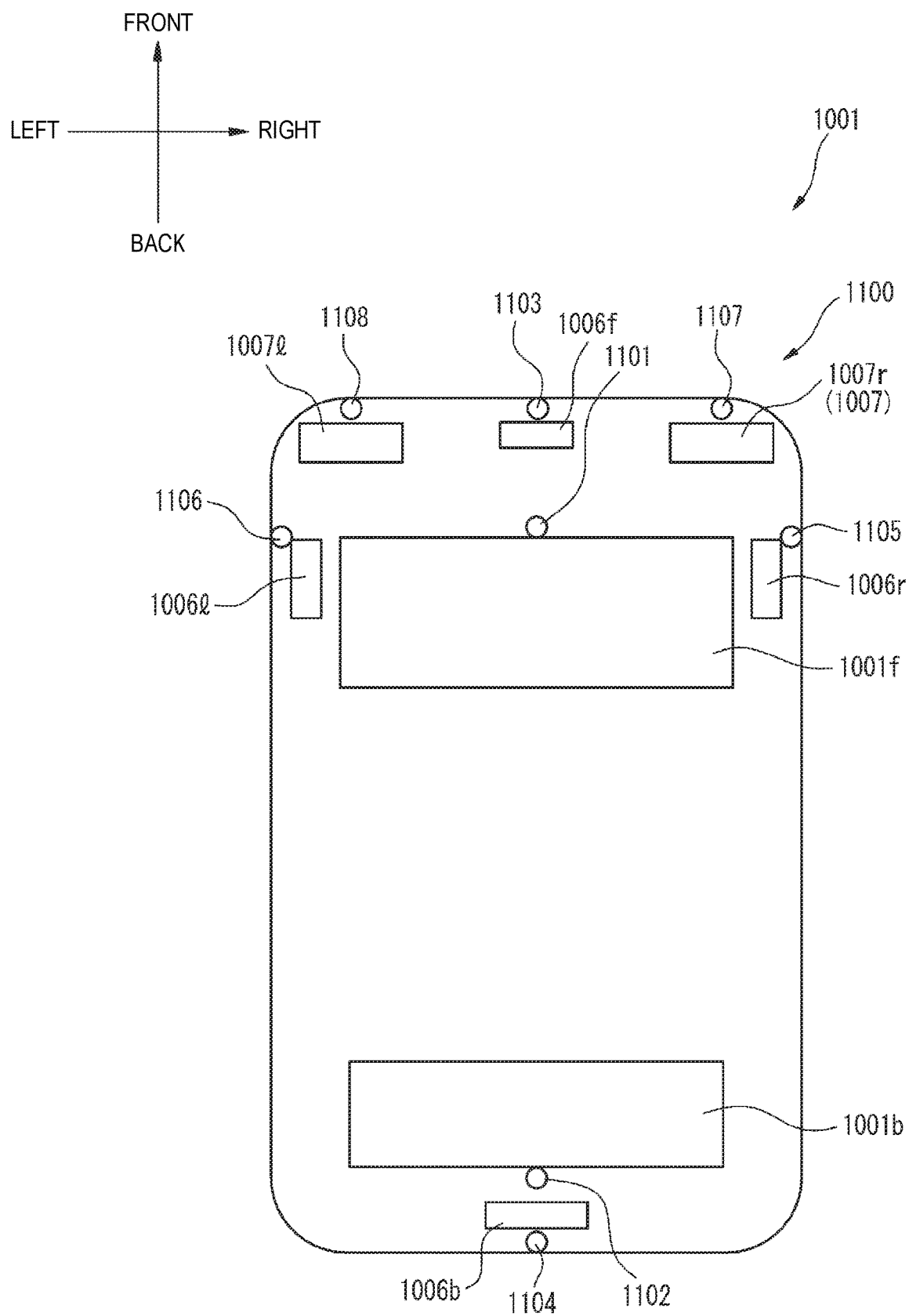
FIG. 23 is a top view of a vehicle including a vehicle cleaner system according to a fourth embodiment.
Figure 24:
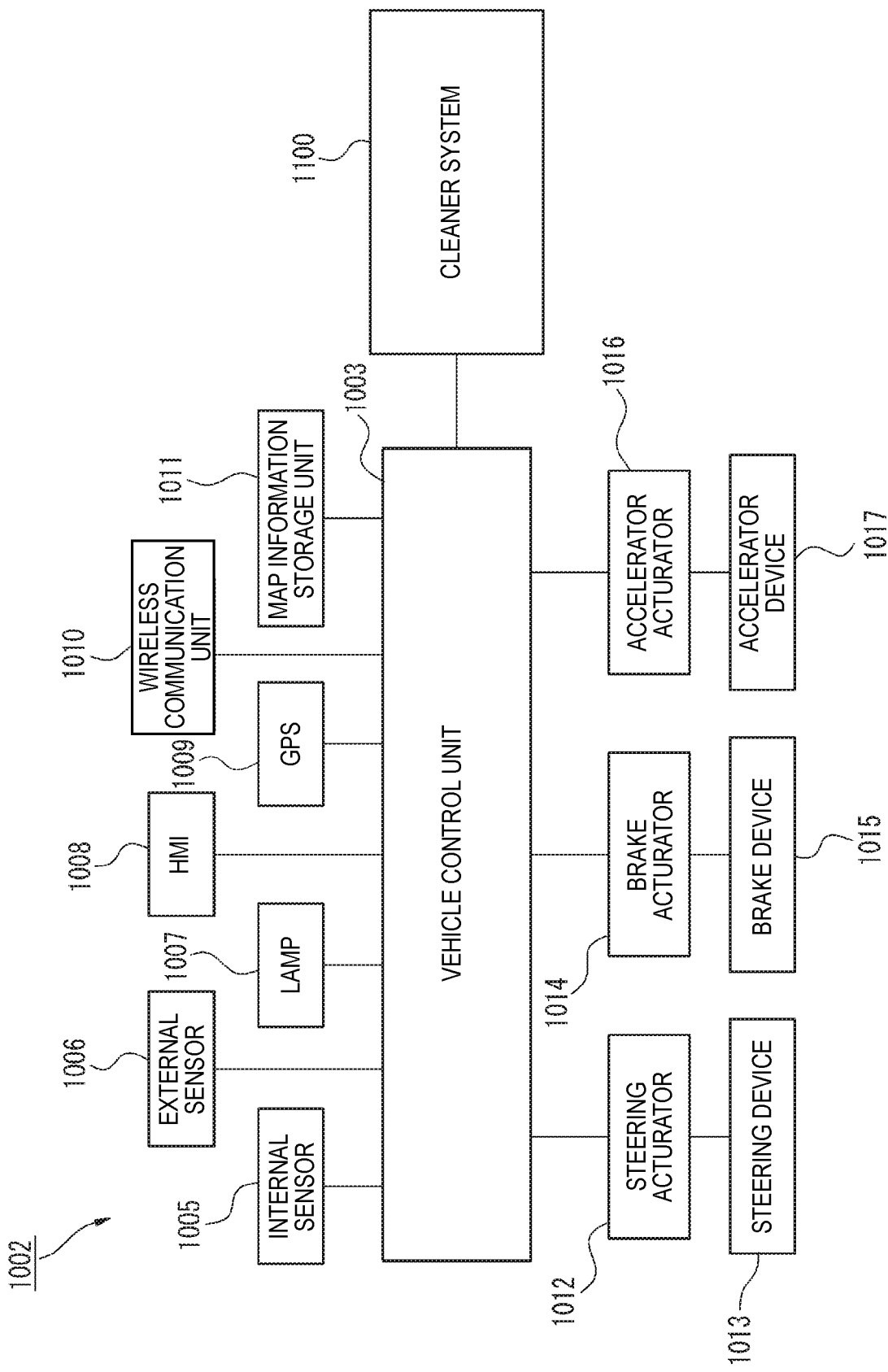
FIG. 24 is a block diagram of a vehicle system.

FIG. 23 is a top view of a vehicle 1001 including the cleaner system 1100 according to the present embodiment. The vehicle 1001 according to the present embodiment does not include the camera 6*c* in the vehicle 1 (see FIG. 1) described in the first embodiment.

As shown in FIG. 23, the vehicle 1001 includes a front window 1001*f* and a rear window 1001*b* as window shields.

The vehicle 1001 further includes the cleaner system 1100. The cleaner system 1100 is a system configured to clean objects to be cleaned provided outside a vehicle interior, that is, to remove foreign matters such as water droplets, mud, dust, and the like adhering to these objects to be cleaned using a cleaning medium. In the present embodiment, the cleaner system 1100 includes a front window washer nozzle (hereinafter referred to as a front WW nozzle) 1101, a rear window washer nozzle (hereinafter referred to as a rear WW nozzle) 1102, a front LiDAR cleaner nozzle (hereinafter referred to as a front LC nozzle) 1103, a rear LiDAR cleaner nozzle (hereinafter referred to as a rear LC nozzle) 1104, a right LiDAR cleaner nozzle (hereinafter referred to as a right LC nozzle) 1105, a left LiDAR cleaner nozzle (hereinafter referred to as a left LC nozzle) 1106, a right headlamp cleaner nozzle (hereinafter referred to as a right HC nozzle) 1107, and a left headlamp cleaner nozzle (hereinafter referred to as a left HC nozzle) 1108.

The front WW nozzle 1101 can be used for cleaning the front window 1001*f*. The rear WW nozzle 1102 can be used for cleaning the rear window 1001*b*. The front LC nozzle 1103 is capable of cleaning a front LiDAR 1006*f*. The rear LC nozzle 1104 is capable of cleaning a rear LiDAR 1006*b*. The right LC nozzle 1105 is capable of cleaning a right LiDAR 1006*r*. The left LC nozzle 1106 is capable of cleaning a left LiDAR 1006*l*. The right HC nozzle 1107 is capable of cleaning a right headlamp 1007*r*. The left HC nozzle 1108 is capable of cleaning a left headlamp 1007*l*.

Figure 25:
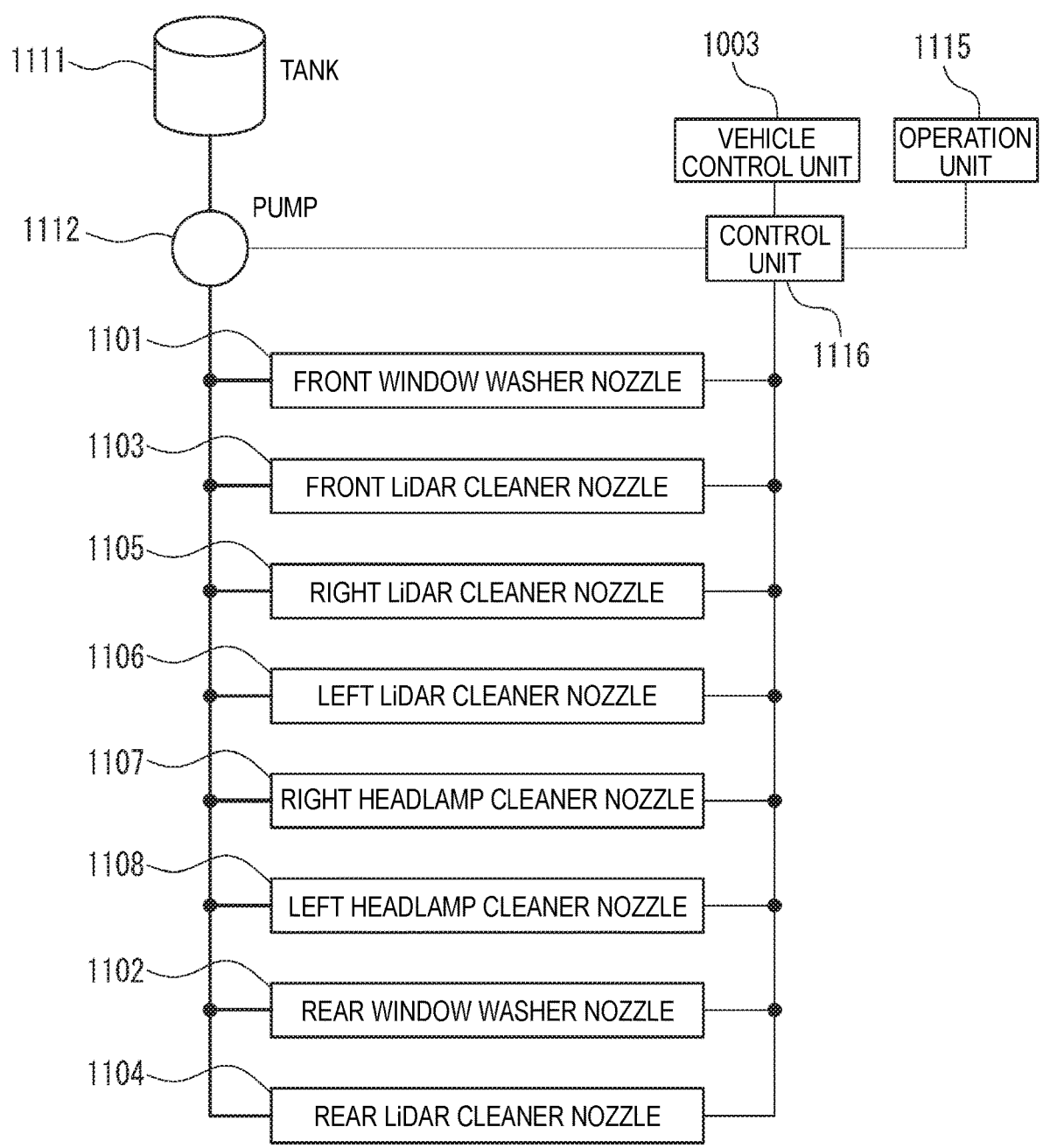
FIG. 25 is a block diagram of the vehicle cleaner system.

FIG. 25 is a block diagram of the cleaner system. In addition to the nozzles 1101 to 1108, the cleaner system includes a tank 1111, a pump 1112 (an example of a single pump), an operation unit 1115, and a control unit 1116 (an example of a cleaner control unit). In the present embodiment, each of the nozzles 1101 to 1108 is configured to be able to discharge the cleaning liquid toward an object to be cleaned.

The nozzles 1101 to 1108 are connected to the tank 1111 via the pump 1112. The pump 1112 sends the cleaning liquid stored in the tank 1111 to each of the nozzles 1101 to 1108.

The operation unit 1115 is a device operable by a user of the vehicle 1001. The operation unit 1115 outputs a signal in response to an operation by the user, and the signal is input to the control unit 1116. For example, the operation unit 1115 may be configured by a switch or the like provided in a vehicle interior.

Each of the nozzles 1101 to 1108 is provided with an actuator that opens the nozzle to discharge the cleaning liquid to the object to be cleaned. The actuator provided in each of the nozzles 1101 to 1108 is electrically connected to the control unit 1116. The control unit 1116 is also electrically connected to the pump 1112, the operation unit 1115, and the vehicle control unit 1003.

For example, when a signal for cleaning the front window 1001*f* is input to the control unit 1116, the control unit 1116 operates the pump 1112 to send the cleaning liquid from the tank 1111 to the front WW nozzle 1101, and operates the actuator of the front WW nozzle 1101 to discharge the cleaning liquid from the front WW nozzle 1101.

Figure 26:
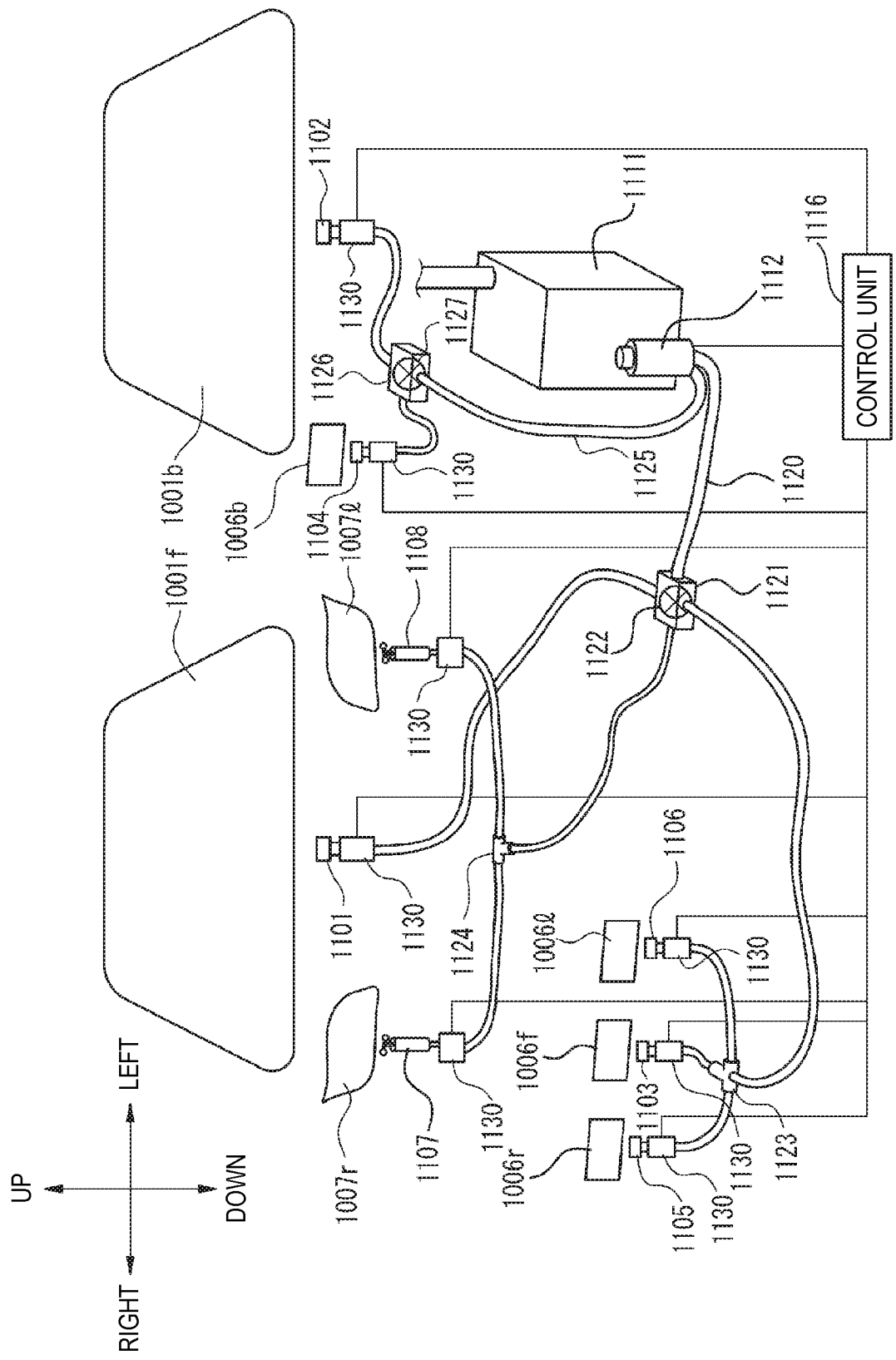
FIG. 26 is a schematic view showing a configuration of the vehicle cleaner system.

FIG. 26 is a schematic diagram showing a configuration of the cleaner system 1100.

As shown in FIG. 26, the pump 1112 is attached to the tank 1111. The pump 1112 is, for example, a motor-driven centrifugal pump, and is electrically connected to the control unit 1116 (an example of a pump control unit). The control unit 1116 constantly pressurizes the cleaning liquid in a pipeline 1120 between the pump 1112 and each injector 1130 described below by rotating the pump 1112 at a constant rotation speed. The pump 1112 is connected to each nozzle on a front side of a vehicle (that is, the front WW nozzle 1101, the front LC nozzle 1103, the right LC nozzle 1105, the left LC nozzle 1106, the right HC nozzle 1107, and the left HC nozzle 1108) via the pipeline 1120. Further, the pump 1112 is connected to each nozzle on a back side of the vehicle (that is, the rear WW nozzle 1102 and the rear LC nozzle 1104) via a pipeline 1125. Specifically, the pipeline 1120 has a branch portion 1121, and is configured such that the pipeline 1120 is branched from the branch portion 1121 toward the front WW nozzle 1101, the plurality of LC nozzles 1103, 1105, 1106, and the plurality of HC nozzles 1107, 1108. The branch portion 1121 is provided with a check valve 1122 that prevents the cleaning liquid from flowing backward. Between the branch portion 1121 and the plurality of LC nozzles 1103, 1105, 1106, a branch portion 1123 is provided to branch the pipeline 1120 toward the LC nozzles 1103, 1105, 1106. Similarly, between the branch portion 1121 and the plurality of HC nozzles 1107, 1108, a branch portion 1124 is provided to branch the pipeline 1120 toward the HC nozzles 1107, 1108. In addition, the pipeline 1125 has a branch portion 1126, and is configured such that the pipeline 1125 is branched from the branch portion 1126 toward the rear WW nozzle 1102 and the rear LC nozzle 1104. The branch portion 1126 is provided with a check valve 1127.

Injectors 1130 (examples of injection operation units) are respectively provided between the branch portion 1121 (the check valve 1122) and the nozzles 1101, 1103, 1105 to 1108 on the front side. Specifically, each injector 1130 is disposed in vicinity of each of the nozzles 1101, 1103, 1105 to 1108, that is, in vicinity of an end portion of the pipeline 1120 opposite to an end portion on a pump 1112 side. Injectors 1130 are also respectively provided between the branch portion 1126 (the check valve 1127) and the nozzles 1102, 1104 on the back side. The injector 1130 is for controlling injection of the cleaning liquid from each of the nozzles 1101 to 1108 toward each object to be cleaned. The injector 1130 is electrically connected to the control unit 1116, receives a signal from the control unit 1116 to open and close a flow path of the cleaning liquid in the injector 1130.

Figure 27:
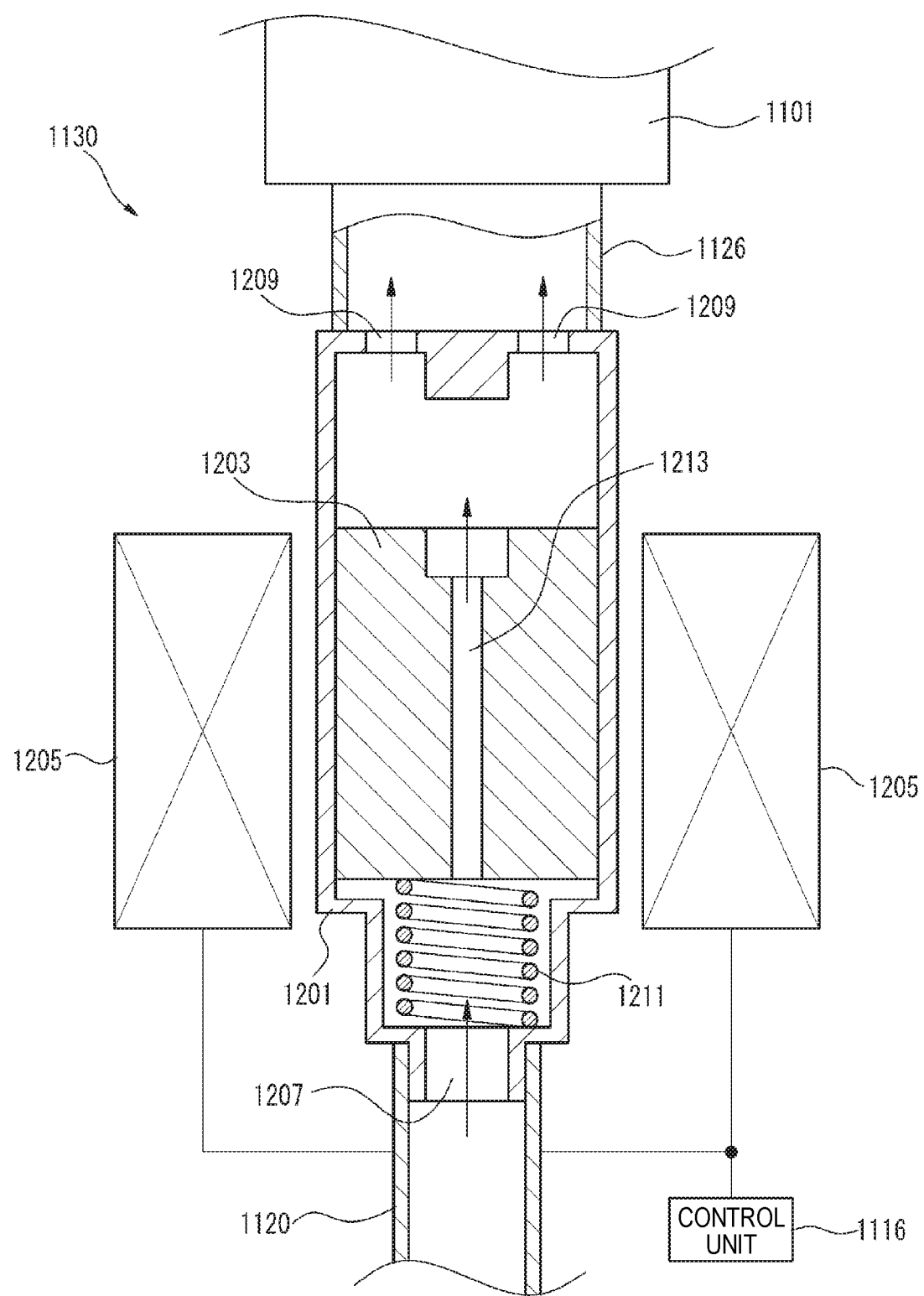
FIG. 27 is a schematic view showing a specific configuration of an injector provided in the vehicle cleaner system.

FIG. 27 is a schematic view showing a specific configuration of the injector 1130. Here, the injector 1130 provided corresponding to the front WW nozzle 1101 among the plurality of injectors 1130 will be described as an example.

The injector 1130 includes a cylinder 1201, a valve body 1203 made of a magnetic material that slides in the cylinder 1201, and a solenoid 1205 disposed outside the cylinder 1201. The solenoid 1205 is electrically connected to the control unit 1116 (an example of an injection operation unit control unit), and energization and de-energization thereof are controlled by a signal input from the control unit 1116. A suction port 1207 that sucks the cleaning liquid from the pipeline 1120 and a discharge port 1209 that discharges the cleaning liquid toward the front WW nozzle 1101 are formed in the cylinder 1201. A spring 1211 that constantly biases the valve body 1203 toward the discharge port 1209 is disposed inside the cylinder 1201.

The suction port 1207 of the cylinder 1201 is connected to the pipeline 1120 connected to the pump 1112, and the constantly pressurized cleaning liquid is supplied into the cylinder 1201 while the pump 1112 is being operated. The discharge port 1209 of the cylinder 1201 is connected to the front WW nozzle 1101 via a pipeline 1128. The discharge port 1209 may be directly connected to the front WW nozzle 1101.

As shown in FIG. 27, when the solenoid 1205 is energized under control of the control unit 1116, the valve body 1203 is attracted by a solenoid electromagnetic force and moves downward in FIG. 27 against a biasing force of the spring 1211. Thereby, the discharge port 1209 is opened, and the cleaning liquid supplied into the cylinder 1201 from the pump 1112 through the suction port 1207 flows through an opening 1213 formed in the valve body 1203, and is supplied from the discharge port 1209 to the front WW nozzle 1101 through the pipeline 1128.

On the other hand, when the solenoid 1205 is not energized under the control of the control unit 1116, the valve body 1203 moves upward in FIG. 27 by the urging force of the spring 1211 and closes the discharge port 1209 of the cylinder 1201. Therefore, the injection of the cleaning liquid to the front WW nozzle 1101 is stopped. In this way, the control unit 1116 can control start and stop of supply of the cleaning liquid to each of the nozzles 1101 to 1108 by operating the injector 1130 based on a signal output from the operation unit 1115 such as a switch operated by the user.

As described above, in the cleaner system 1100 according to the present embodiment, the injector 1130 that controls the ejection of the cleaning liquid from each of the nozzles 1101 to 1108 to each object to be cleaned is provided between the single pump 1112 and each of the nozzles 1101 to 1108. Further, the control unit 1116 constantly pressurizes the cleaning liquid in the pipelines 1120, 1125 by the pump 1112, and individually operates the injector 1130 to inject the cleaning liquid from each of the nozzles 1101 to 1108. Thereby, since the control unit 1116 can inject the cleaning liquid only from required ones of the plurality of nozzles 1101 to 1108, the object to be cleaned required by the scene is easily kept clean while saving the cleaning liquid.

The control unit 1116 can control an operation of each injector 1130 in a plurality of cleaning modes (an individual control mode, a partial interlock mode, and overall interlock mode). The individual control mode is a mode capable of individually controlling injection of the cleaning liquid from each of the nozzles 1101 to 1108. In the individual control mode, the control unit 1116 operates each injector 1130 individually based on a signal output from the operation unit 1115. The partial interlock mode is a mode capable of interlockingly controlling injection of the cleaning liquid from two or more specific nozzles among the nozzles 1101 to 1108. In the partial interlock mode, the control unit 1116 can operate so as to interlock the injector 1130 of the front WW nozzle 1101 and the injector 1130 of the front LC nozzle 1103, to interlock the injector 1130 of the rear WW nozzle 1102 and the injector 1130 of the rear LC nozzle 1104, to interlock the injector 1130 of the right LC nozzle 1105 and the injector 1130 of the right HC nozzle 1107, or to interlock the injector 1130 of the left LC nozzle 1106 and the injector 1130 of the left HC nozzle 1108, for example. The overall interlock mode is a mode capable of interlockingly controlling injection of the cleaning liquid from all the nozzles 1101 to 1108. When it is determined that the cleaning liquid should be injected to all the objects to be cleaned, the control unit 1116 selects the overall interlock mode and operates the injectors 1130 of all the nozzles 1101 to 1108. In this way, since the control unit 1116 has a plurality of cleaning modes, a mode can be appropriately selected according to the scene in which the cleaners (the nozzles 1101 to 1108) are used, and the object to be cleaned can be cleaned efficiently.

The control unit 1116 may control each injector 1130 such that at least one of the nozzles 1101 to 1108 is different from at least one of the other nozzles in at least one of an injection amount, an injection pressure, injection time, and the number of injections of the cleaning liquid. Alternatively, each of the nozzles 1101 to 1108 may be formed such that at least one of the nozzles 1101 to 1108 is different from at least one of the other nozzles in a shape of an opening of the nozzle, the injection shape and the injection area of the cleaning liquid. For example, a dirt sensor may be provided to detect dirt on each object to be cleaned (front window 1001f, rear window 1001b, front LiDAR 1006f, rear LiDAR 1006b, right LiDAR 1006r, left LiDAR 1006l, right headlamp 1007r, left headlamp 1007l). For example, when it is determined that dirt degree of the front LiDAR 1006f is higher than that of the right LiDAR 1006r and the left LiDAR 1006l by detection by the dirt sensor, the control unit 1116 can increase the ejection pressure of the cleaning liquid from the front LC nozzle 1103 on the front LiDAR 1006f to be higher than the ejection pressure of the cleaning liquid from the right LC nozzle 1105 and the left LC nozzle 1106 on the right LiDAR 1106*r* and the left LiDAR 1006*l*, lengthen the injection time of the cleaning liquid, or increase the number of injections of the cleaning liquid. By varying the injection method of the cleaning liquid among the plurality of nozzles in this way, each object to be cleaned can be cleaned with an appropriate cleaning method at low cost.

Various Modifications

Although the embodiment of the present invention has been described, it is needless to say that the technical scope of the present invention should not be interpreted as being limited to the description of the present embodiment. The present embodiment is merely an example and it would appreciated by those skilled in the art that various modifications of the embodiment can be made within the scope of the invention described in the claims. The technical scope of the present invention should be determined based on the scope of the invention described in the claims and the equivalent scope thereof.

In the present embodiment, the driving mode of the vehicle has been described as including the fully automatic driving mode, the advanced driving assistance mode, the driving assistance mode, and the manual driving mode. However, the driving mode of the vehicle should not be limited to these four modes. The driving mode of the vehicle may include at least one of these four modes. For example, only one of the driving modes of the vehicle may be executable. For example, the driving mode of the vehicle may only include the fully automatic driving mode.

Further, a classification and a display form of the driving mode of the vehicle may be appropriately changed according to regulations or rules related to automatic driving in each country. Similarly, definitions of the "fully automatic driving mode", the "advanced driving assistance mode", and the "driving assistance mode" in the description of the present embodiment are merely examples and may be appropriately changed according to regulations or rules related to automatic driving in each country.

Although an example in which the cleaner systems 100, 1100 are mounted on vehicles that can be automatically driven has been described in the above embodiment, the cleaner systems 100, 1100 may be mounted on vehicles that cannot be automatically driven.

The timing chart in the first embodiment described above is an example, and the present invention is not limited thereto. Although an example in which the number of operations of each cleaner is set per four or eight inputs of the signal has been described in the timing chart described above, the present invention is not limited thereto. Further, although an example in which each cleaner is operated simultaneously with the input of the signal has been described in the timing chart described above, each cleaner may be operated by delaying the input of the cleaner operation signal.

In the first embodiment described above, an example in which the cleaner system 100 is configured to clean one or more of various objects to be cleaned when the cleaner switch 115 is operated has been described. That is, the user does not specify the object to be cleaned, and the cleaner system 100 specifies the object to be cleaned. However, the cleaner system 100 may be configured such that in addition to the cleaner switch 115, a camera cleaning button that is operated when the user wants to clean the camera 6*c* is provided, and the camera cleaner 109 is operated when the camera cleaning button is operated. According to such a configuration, when the user specifies the object to be cleaned, the specified object to be cleaned is allowed to be cleaned, and the cleaner system 100 sequentially cleans the objects to be cleaned with high priority without the user being particularly conscious as in the above embodiment, thereby reducing the burden on the user.

Although the cleaner system 100 in which a plurality of modes can be selected has been described in the first embodiment described above, only a single mode may be recorded in a recording medium, and the cleaner control unit 116 may execute only a specific mode. However, the cleaner system 100 is preferably configured to be able to execute at least two or more of the above modes A to I, 1 to 11 so that a mode can be selected in accordance with an optimal scene.

Although the cleaner system 100 has been described as including the external sensor 6 in the first to third embodiments described above, the cleaner system 100 may not include the external sensor 6. However, the cleaner system 100 preferably includes the external sensor 6 since positioning accuracy of the cleaners 103 to 106, 109 with respect to the external sensor 6 is easily increased when the cleaner system 100 is configured as an assembly including the external sensor 6. When the cleaner system 100 is mounted on the vehicle 1, the external sensor 6 can be incorporated as well, so that assembling property to the vehicle 1 is also improved.

Although 103 to 106 that clean the LiDARs 6*f*, 6*b*, 6*r*, 6*l*, and 109 that cleans the camera 6*c* have been described as cleaning the external sensor 6 in the first to third embodiments described above, the present invention is not limited thereto. In the cleaner system 100, a cleaner or the like that cleans the radar may be provided instead of the sensor cleaners LC 103 to 106, camera cleaner 109, or may be provided together with the sensor cleaners 103 to 106, 109.

The external sensor 6, such as the LiDARs 6*f* 6*b*, 6*r*, 6*l* may have a detection surface and a cover that covers the detection surface. The cleaner that cleans the external sensor 6 may be configured to clean the detection surface, or may be configured to clean the cover that covers the sensor.

The cleaning medium discharged by the cleaner system 100 includes air, water, or a cleaning liquid containing a detergent. The cleaning medium discharged to each of the front and rear windows 1*f*, 1*b*, the headlamps 7*r*, 7*l*, the LiDARs 6*f*, 6*b*, 6*r*, 6*l*, and the camera 6*c* may be different or the same.

Although an example in which the cleaners 101, 103, 105 to 109 are connected to the front tank 111 and the cleaners 102, 104 are connected to the rear tank 113 has been described in the first to third embodiments described above, the present invention is not limited thereto.

The cleaners 101 to 109 may be connected to a single tank. The cleaners 101 to 109 may be respectively connected to tanks different from each other.

Alternatively, the cleaners 101 to 109 may be connected to a common tank for each type of the object to be cleaned. For example, the LCs 103 to 106 may be connected to a common first tank, and the HCs 107, 108 may be connected to a second tank different from the first tank.

Alternatively, the cleaners 101 to 109 may be connected to a common tank for each arrangement position of the object to be cleaned. For example, the front WW 101, the front LC 103, and the camera cleaner 109 may be connected to a common front tank, the right LC 105 and right HC 107 may be connected to a common right tank, the rear WW 102 and the rear LC 104 may be connected to a common rear tank, and the left LC 106 and the left HC 108 may be connected to a common left tank.

Although an example in which the cleaning medium is discharged from the cleaners 101 to 109 by operating the actuators provided in the cleaners 101 to 109 has been described in the first to third embodiments described above, the present invention is not limited thereto.

A normally closed valve may be provided in each of the cleaners 101 to 109, and a pump may be operated such that a pressure between the tank and the cleaners 101 to 109 is always high, and the cleaner control unit 116 may open the valve provided in each of the cleaners 101 to 109 to discharge the cleaning medium from each of the cleaners 101 to 109.

Alternatively, each of the cleaners 101 to 109 may be connected to a separate pump, and the cleaner control unit 116 may control each pump individually to control discharge of the cleaning medium from each of the cleaners 101 to 109. In this case, each of the cleaners 101 to 109 may be connected to a different tank, or may be connected to a common tank.

The cleaners 101 to 109 are provided with one or more discharge holes to discharge the cleaning medium. The cleaners 101 to 109 may be provided with one or more discharge holes to discharge the cleaning liquid and one or more discharge holes to discharge air.

Each of the cleaners 101 to 109 may be provided individually, or a plurality of the cleaners may be unitized. For example, the right LC 105 and the right HC 107 may be configured as a single unit. For a mode in which the right headlamp 7r and the right LiDAR 6r are integrated, the right LC 105 and the right HC 107 may be configured as a single unit.

Although the pump 1112 and the injector 1130 of each of the nozzles 1101 to 1108 are both controlled by the control unit 1116 in the fourth embodiment, the present invention is not limited to this example. For example, a pump control unit that controls the pump 1112 and an injector control unit (the injection operation unit control unit) that controls each injector 1130 may be separately provided. Although a separate injector 1130 is provided corresponding to each of the nozzles 1101 to 1108 in the fourth embodiment, one injector 1130 may be provided for a plurality of LC nozzles 1103, 1105, 1106, and one injector 1130 may be provided for a plurality of HC nozzles 1107, 1108, for example. In this case, for example, the injectors 1130 corresponding to the plurality of LC nozzles 1103, 1105, 1106 is preferably provided between the branch portion 1121 and the branch portion 1123 in the pipeline 1120. For example, the injector 1130 corresponding to the plurality of HC nozzles 1107, 1108 is preferably provided between the branch portion 1121 and the branch portion 1124 in the pipeline 1120.

Although an example in which the nozzles 1101 to 1108 are connected to the tank 1111 is illustrated in the fourth embodiment described above, the present embodiment is not limited thereto.

Figure 28:
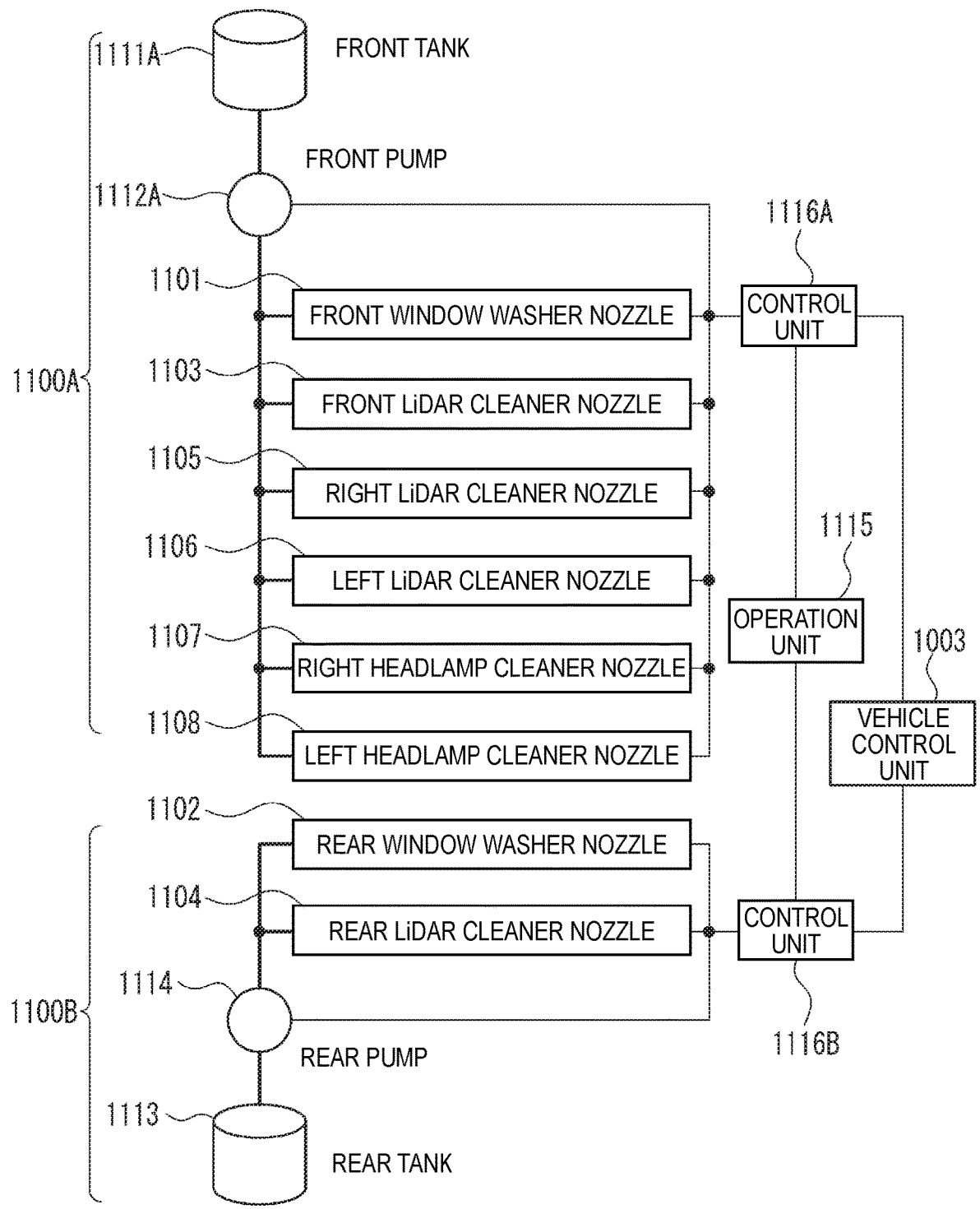
FIG. 28 is a block diagram according to a modification of the vehicle cleaner system.

FIG. 28 is a block diagram of cleaner systems 1100A, 1100B according to a modification.

As shown in FIG. 28, the cleaner system 1100A includes a front WW nozzle 1101, a front LC nozzle 1103, a right LC nozzle 1105, a left LC nozzle 1106, a right HC nozzle 1107, a left HC nozzle 1108, a front tank 1111A, a front pump 1112A (an example of a single pump), and a control unit 1116A (an example of a cleaner control unit). The front WW nozzle 1101, the front LC nozzle 1103, the right LC nozzle 1105, the left LC nozzle 1106, the right HC nozzle 1107, and the left HC nozzle 1108 are connected to the front tank 1111A via the front pump 1112A. The front pump 1112A sends the cleaning liquid stored in the front tank 1111A to each of the nozzles 1101, 1103, 1105 to 1108.

The cleaner system 1100B includes a rear WW nozzle 1102, a rear LC nozzle 1104, a rear tank 1113, a rear pump 1114 (an example of a single pump), and a control unit 1116B (an example of a cleaner control unit). The rear WW nozzle 1102 and the rear LC nozzle 1104 are connected to the rear tank 1113 via the rear pump 1114. The rear pump 1114 sends the cleaning liquid stored in the rear tank 1113 to each of the rear WW nozzle 1102 and the rear LC nozzle 1104.

As shown in FIG. 28, the cleaner system may be configured separately at the front portion and the rear portion of the vehicle 1001. Also in this case, the single front pump 1112A is connected to each of the nozzles 1101, 1103, 1105 to 1108 on a front side via a pipe line, and the injector 1130 that controls injection of the cleaning liquid from each of the nozzles 1101, 1103, 1105 to 1108 toward each object to be cleaned is provided corresponding to each of the nozzles 1101, 1103, 1105 to 1108. Further, the control unit 1116A constantly pressurizes the cleaning liquid in the pipeline by the front pump 1112A, and individually operates the injector 1130 to inject the cleaning liquid from each of the nozzles 1101, 1103, 1105 to 1108. Similarly, the single rear pump 1114 is connected to each of the nozzles 1102, 1104 on a back side via a pipe line, and the injector 1130 that controls injection of the cleaning liquid from each of the nozzles 1102, 1104 toward each object to be cleaned is provided corresponding to each of the nozzles 1102, 1104. Further, the control unit 1116B constantly pressurizes the cleaning liquid in the pipeline by the rear pump 1114, and individually operates the injector 1130 to inject the cleaning liquid from each of the nozzles 1102, 1104. Thereby, in each of the cleaner systems 1100A, 1100B including the single pumps 1112A, 1114, the control units 1116A or 1116B can inject the cleaning liquid only from necessary ones of the plurality of nozzles 1101 to 1108, and thus the object to be cleaned required by the scene is easily kept clean while saving the cleaning liquid.

The nozzles 1101 to 1108 may be connected to tanks different from each other. Alternatively, the nozzles 1101 to 1108 may be connected to a common tank for each type of the object to be cleaned. For example, the LiDAR nozzles 1105 to 1108 may be connected to a common first tank, and the lamp nozzles 1107 and 1108 may be connected to a second tank different from the first tank.

Alternatively, the nozzles 1101 to 1108 may be connected to a common tank for each arrangement position of the object to be cleaned. For example, the front WW nozzle 1101 and the front LC nozzle 1103 may be connected to a common front tank, the right LC nozzle 1105 and the right HC nozzle 1107 may be connected to a common right tank, the rear WW nozzle 1102 and the rear LC nozzle 1104 may be connected to a common rear tank, the left LC nozzle 1106 and the left HC nozzle 1108 may be connected to a common left tank.

Even in these cases, by employing a configuration in which the cleaning liquid in the pipeline is constantly pressurized by a single pump and the injector 1130 is individually operated to inject the cleaning liquid from each of the nozzles 1101 to 1108, cleanliness of the object to be cleaned required by the scene can be maintained while saving the cleaning liquid.

Although the nozzles 1103 to 1106 that clean the LiDARs have been described as nozzles that clean the external sensor in the fourth embodiment described above, the present invention is not limited thereto. The cleaner system 1100 may include a nozzle that cleans a camera, a nozzle that cleans a radar, and the like instead of the nozzles 1103 to 1106, or may include the nozzles 1103 to 1106. When a plurality of external sensors (for example, the LiDAR and the camera) having different detection methods and a plurality of external sensors (for example, the front LiDAR and the rear LiDAR) having different mounting positions in the vehicle 1001 are provided with a plurality of corresponding sensor cleaners (sensor cleaner nozzles), the control unit 1116 may operate these sensor cleaners such that cleaning methods of the plurality of sensor cleaners are different from each other. The external sensors such as the LiDAR and the camera having different detection methods often require different scenes. Accordingly, by varying the cleaning method for each type of the external sensor, the cleanliness can be easily kept for each sensor according to a specific scene.

The external sensor such as the LiDAR, may include a detection surface and a cover that covers the detection surface. The nozzle that cleans the external sensor may be configured to clean the detection surface, or may be configured to clean the cover that covers the sensor.

The cleaning medium discharged by the cleaner system includes air, water, or a cleaning liquid containing a detergent. The cleaning medium discharged to each of the front and rear windows, the headlamp, and the LiDAR may be different or the same.

The nozzles 1101 to 1108 are provided with one or more discharge holes to discharge the cleaning medium. The nozzles 1101 to 1108 may be provided with one or more discharge holes to discharge the cleaning liquid and one or more discharge holes to discharge air.

Each of the nozzles 1101 to 1108 may be provided individually, or a plurality of the nozzles may be unitized. For example, the right LC nozzle 1105 and the right HC nozzle 1107 may be configured as a single unit. For a mode in which the right headlamp 1007$r$ and the right LiDAR 1006$r$ are integrated, the right LC nozzle 1105 and the right HC nozzle 1107 may be configured as a single unit.

In the fourth embodiment described above, the input of the operation signal to the control unit 1116 is based on a signal output from the operation unit 1115 such as a switch operated by the user. However, a signal output when a dirt sensor mounted on each part of the vehicle detects dirt may be input to the control unit 1116, for example.

Alternatively, a signal output when the dirt sensor detects dirt may be input to the vehicle control unit 1003 (an ECU or an automatic operation control unit), and a signal for operating at least one of the various cleaner nozzles from the vehicle control unit 1003 may be input to the control unit 1116.

A signal output when the sensor detects dirt may be input to the vehicle control unit 1003, and a signal for operating at least one of the various cleaners from the vehicle control unit 1003 may be input to the various cleaners. In this case, the control unit 1116 is mounted as a part of the vehicle control unit 1003.

The present application is based on Japanese Patent Application No. 2017-115872 filed on Jun. 13, 2017, Japanese Patent Application No. 2017-115874 filed on Jun. 13, 2017, Japanese Patent Application No. 2017-115876 filed on Jun. 13, 2017, and Japanese Patent Application No. 2017-115878, filed on Jun. 13, 2017, the contents of which are incorporated herein by reference.

The invention claimed is:

1. A vehicle cleaner system comprising:
   a window washer configured to clean a front window of a vehicle;
   a lamp cleaner configured to clean a headlamp;
   a sensor cleaner configured to clean a sensor that detects information outside the vehicle; and
   a cleaner control unit configured to operate the window washer, the lamp cleaner, and the sensor cleaner in accordance with an input signal,
   wherein the window washer, the lamp cleaner, and the sensor cleaner each comprise a nozzle,
   wherein the input signal comprises a mode switching signal that is generated by operating a single switch and that indicates a selected mode from a plurality of modes that are different from each other,
   wherein the plurality of modes comprise a plurality of daytime modes and a plurality of nighttime modes,
   wherein the cleaner control unit switches between the plurality of daytime modes and the plurality of nighttime modes according to a sensed ambient brightness,
   wherein each of the plurality of modes is defined by a combination of:
      a non-zero number of operations of the window washer per a predetermined number of operation signals;
      a non-zero number of operations of the lamp cleaner per the predetermined number of operation signals; and
      a non-zero number of operations of the sensor cleaner per the predetermined number of operation signals, and
   wherein the cleaner control unit is configured to operate the window washer, the lamp cleaner, and the sensor cleaner in the selected mode.

2. The vehicle cleaner system according to claim 1, wherein the sensor comprises a LiDAR.

3. The vehicle cleaner system according to claim 1, further comprising a pump, wherein the nozzles connected to the window washer, the lamp cleaner, and the sensor cleaner are connected to the pump via a pipeline.

4. The vehicle cleaner system according to claim 3, further comprising:
   a pump controller configured to control the pump; and
   an injector configured to control injection of a cleaning medium to each nozzle for ejection toward an object to be cleaned,
   wherein the pump controller is configured to constantly pressurize the cleaning medium in the pipeline by the pump, and
   wherein the vehicle cleaner system further comprises an injector controller configured to operate the injector to inject the cleaning medium to each nozzle.

5. The vehicle cleaner system according to claim 4, further comprising:
   a check valve provided at a branch portion for branching the pipeline toward each nozzle,
   wherein the injector is disposed between each nozzle and the check valve.

* * * * *